United States Patent [19]

Saitoh

[11] Patent Number: 5,583,769

[45] Date of Patent: Dec. 10, 1996

[54] AUTOMATIC TRAIN OPERATION APPARATUS INCORPORATING SECURITY FUNCTION WITH IMPROVED RELIABILITY

[75] Inventor: Hiroo Saitoh, Fuchu, Japan

[73] Assignee: Kabushiki Kaisha Toshiba, Kanagawa-ken, Japan

[21] Appl. No.: 406,246

[22] Filed: Mar. 16, 1995

Related U.S. Application Data

[63] Continuation of Ser. No. 763,149, Sep. 20, 1991, abandoned.

[30] Foreign Application Priority Data

Sep. 21, 1990 [JP] Japan .................................. 2-250370

[51] Int. Cl.$^6$ .................................................. B61B 13/00
[52] U.S. Cl. ...................................................... 364/424.024
[58] Field of Search ........................ 364/426.01, 424.02, 364/184, 436, 513; 244/182 B, 34 CT; 371/9; 375/107; 340/825.17; 395/11

[56] References Cited

U.S. PATENT DOCUMENTS

| | | | |
|---|---|---|---|
| 3,582,644 | 6/1971 | Schatzel | 246/34 CT |
| 3,593,307 | 7/1971 | Gouge, Jr. | 340/172.5 |
| 3,681,578 | 8/1972 | Stevens | 235/153 |
| 3,735,356 | 5/1973 | Yates | 340/172.5 |
| 3,783,250 | 1/1974 | Fletcher et al. | 235/153 AK |
| 3,895,223 | 7/1975 | Neuner et al. | 235/153 AE |
| 4,015,246 | 3/1977 | Hopkins, Jr. et al. | 340/172.5 |

(List continued on next page.)

FOREIGN PATENT DOCUMENTS

| | | |
|---|---|---|
| 61-70605 | 4/1986 | Japan . |
| 61-234405 | 10/1986 | Japan . |

OTHER PUBLICATIONS

T. IEE Japan, vol. 109–C, No. 5, (1989) (presented Jun. 22, 1988) Realization of an Automatic Train Operation Device Based on Predictive Fuzzy Control, by H. Oshima, et al.

Proceedings of the 24th Railway Cybernetics Symposium, Feb. 1988, Automatic Train Operation Device for Sendai Subway Nanboku Line, by S. Shoji et al.

Guo et al., "Sensor Failure Detection and Recovery by Neural Networks", Neural Networks, 1991 IEEE Int'l Conference, pp. 221–226, 1991.

Lewinski, "Design of Fail Safe Computer Systems for Railway Control", Computers and Safety 1989 (IEEE Conf. Pub. 314), pp. 59–61, 1989.

Watkins, "Amtrak's Next Generation Passenger Locomotive", Railroad, 1991 Joint IEEE/ASME Conference, pp. 147–150, 1991.

*Primary Examiner*—Gary Chin
*Assistant Examiner*—Stephen J. Walder, Jr.
*Attorney, Agent, or Firm*—Finnegan, Henderson, Farabow, Garrett & Dunner, L.L.P.

[57] ABSTRACT

An automatic train operation apparatus capable of realizing an optimal train operation with an improved reliability. The apparatus includes: an ATO/C system including a plurality of ATO/C units redundantly provided, each ATO/C unit having a fail safe configuration formed by a plurality of execution processors and a supervisor processor for monitoring normal operations of the execution processors, each execution processor being capable of executing an automatic train operation program, and all of the execution processors in the plurality of ATO/C units executing an identical automatic train operation program simultaneously; and a majority logic circuit for selecting an output obtained by a majority of the execution processors in the ATO/C units of the ATO/C system as a control command output for controlling a train operation. Each execution processor in the ATO/C system operates as a neural network with a learning function.

15 Claims, 17 Drawing Sheets

U.S. PATENT DOCUMENTS

| | | | |
|---|---|---|---|
| 4,029,952 | 6/1977 | Giras et al. | 235/151.21 |
| 4,209,828 | 6/1980 | Anderson et al. | 364/426 |
| 4,284,256 | 8/1981 | Norton | 246/5 |
| 4,302,811 | 11/1981 | McElhenny | 364/426 |
| 4,327,415 | 4/1982 | Rush et al. | 364/436 |
| 4,410,154 | 10/1983 | Matty | 246/182 R |
| 4,562,575 | 12/1985 | Townsend | 371/9 |
| 4,618,930 | 10/1986 | Ueno et al. | 364/426 |
| 4,797,670 | 1/1989 | Joyner | 340/825.17 |
| 4,912,654 | 3/1990 | Wood | 364/513 |
| 5,008,805 | 4/1991 | Fiebig et al. | 364/184 |
| 5,095,443 | 2/1992 | Watanabe | 395/11 |
| 5,117,442 | 5/1992 | Hall | 375/107 |
| 5,172,316 | 12/1992 | Root et al. | 364/426.01 |

AUTOMATIC TRAIN OPERATION APPARATUS INCORPORATING SECURITY FUNCTION WITH IMPROVED RELIABILITY

This application is a continuation of application Ser. No. 07/763,149, filed Sep. 20, 1991, now abandoned.

BACKGROUND OF THE INVENTION

1. Field of the Invention

The present invention relates to an automatic train operation apparatus for operating a train automatically from an initial start position to a final stop position.

2. Description of the Background Art

Conventionally, an automatic train operation (ATO) apparatus has a configuration shown in FIG. 1, where the apparatus comprises an AT0 device 1; a security device 2 such as an ATC (automatic train control device) or ATS (automatic train stop device) connected to the ATO device 1; a master controller 3 for allowing manual train operation control which is connected with the AT0 device 1; a control device 4 including a power running controller 4A and a break controller 4B which are controlled by either the AT0 device 1 or the master controller 3; a driving device 5 such as a DC motor and an induction motor which is controlled by the control device 4; an air break operation device 7 for operating an air break of a train; an air break controller 6 for activating the air break operation device 7 while monitoring an electric break power so as to control a total break power of a train, which is controlled by either the AT0 device 1 or the master controller 3; a ground signal receiver 8 for receiving ground signals from rails which is connected with the security device 2; a train pick up 9 for receiving ground terminal signals which is connected with the ATO device 1; a tach generator 10 for generating a train speed signal which is connected with the security device 2; and a display device 11 for displaying a train operation realized by the ATO device 1.

In such a conventional ATO apparatus, the AT0 device 1 and the security device 2 are provided separately, and the ATO device 1 and the master controller 3 cooperate such that the ATO device is inactive while the master controller 3 is operated, and the ATO device 1 is active while the master controller 3 is not operated.

Now, as shown in FIG. 2, the conventional ATO device 1 includes a single ATO unit 12, a triple ATC unit system 13, a majority logic circuit 14 for determining an output of the triple ATC unit system 13, and an output circuit 15, such that an improved reliability due to the redundancy can be achieved for the outputs of the triple ATC unit system 13 which are supplied to the output circuit 15 by using the majority logic circuit 14 which operates in a 2-out-of-3 policy.

For this conventional AT0 device 1 of FIG. 2, a total reliability can be calculated according to a diagram shown in FIG. 3, where a reliability of the ATO unit 12 is set equal to $R_O$ and a reliability of each ATC unit 13 is set equal to $R_C$. This diagram of FIG. 8 indicates that the total reliability R is given by:

$$R = (3R_C^2 - 2R_C^3) \cdot R_O \qquad (1)$$

in which the total reliability R takes a form of a product of the reliability of the ATO unit 12 and the reliability of each ATC unit 13. Therefore, in a case $R_C = R_O = 0.9$ for example, the resulting total reliability can only be R=0.875, which is lower than either one of the reliability of the ATO unit 12 and the reliability of each ATC unit 13.

Thus, in a conventional ATO device, the reliability of the ATO device is lower than the reliability of the components involved in the ATO device.

On the other hand, recently, an application of a fuzzy control method has been introduced to the ATO device 1 of the ATO apparatus instead of a conventional PID control method in which the running pattern is strictly followed, in order to improve to passenger comfort and an accuracy of the stop position.

However, in a conventional ATO device using the fuzzy control method, an enormous amount of time is necessary for learning the operation to become a skillful human operator.

SUMMARY OF THE INVENTION

It is therefore an object of the present invention to provide an automatic train operation apparatus capable of realizing an optimal train operation with an improved reliability.

According to one aspect of the present invention there is provided an automatic train operation apparatus incorporating a security function, comprising: an ATO/C system including a plurality of ATO/C units provided redundantly, each ATO/C unit having a fail safe configuration formed by a plurality of execution processors and a supervisor processor for monitoring normal operations of the execution processors, each execution processor being capable of executing an automatic train operation program, and all of the execution processors in the plurality of ATO/C units executing an identical automatic train operation program simultaneously; and a majority logic means for selecting an output obtained by a majority of the execution processors in the ATO/C units of the ATO/C system as a control command output for controlling a train operation.

According to another aspect of the present invention there is provided an automatic train operation apparatus incorporating a security function, comprising: input means for entering external information signals; an ATO/C system including at least one ATO/C unit having a fall safe configuration formed by a plurality of execution processors and a supervisor processor for monitoring normal operations of the execution processors, each execution processor being capable of executing an automatic train operation program, where the execution processors in the ATO/C unit simultaneously execute an identical automatic train operation program for obtaining a control command output by using the external information signals entered by the input means; and control means for controlling a power running notch and a break notch of a train according to the control command output outputted by the ATO/C unit.

According to another aspect of the present invention there is provided an automatic train operation method using a neural network with a learning function, comprising the steps of: controlling a power running notch and a break notch of a train by estimating a train speed, a running distance, and a stop position; evaluating a quality of train operation for a train operation resulting from the controlling at the controlling step; and adjusting the controlling at the controlling step such that the quality of the train operation resulting from the controlling at the controlling step approaches a desired quality.

Other features and advantages of the present invention will become apparent from the following description taken in conjunction with the accompanying drawings.

DETAILED DESCRIPTION OF THE PREFERRED EMBODIMENTS

Figure 1:
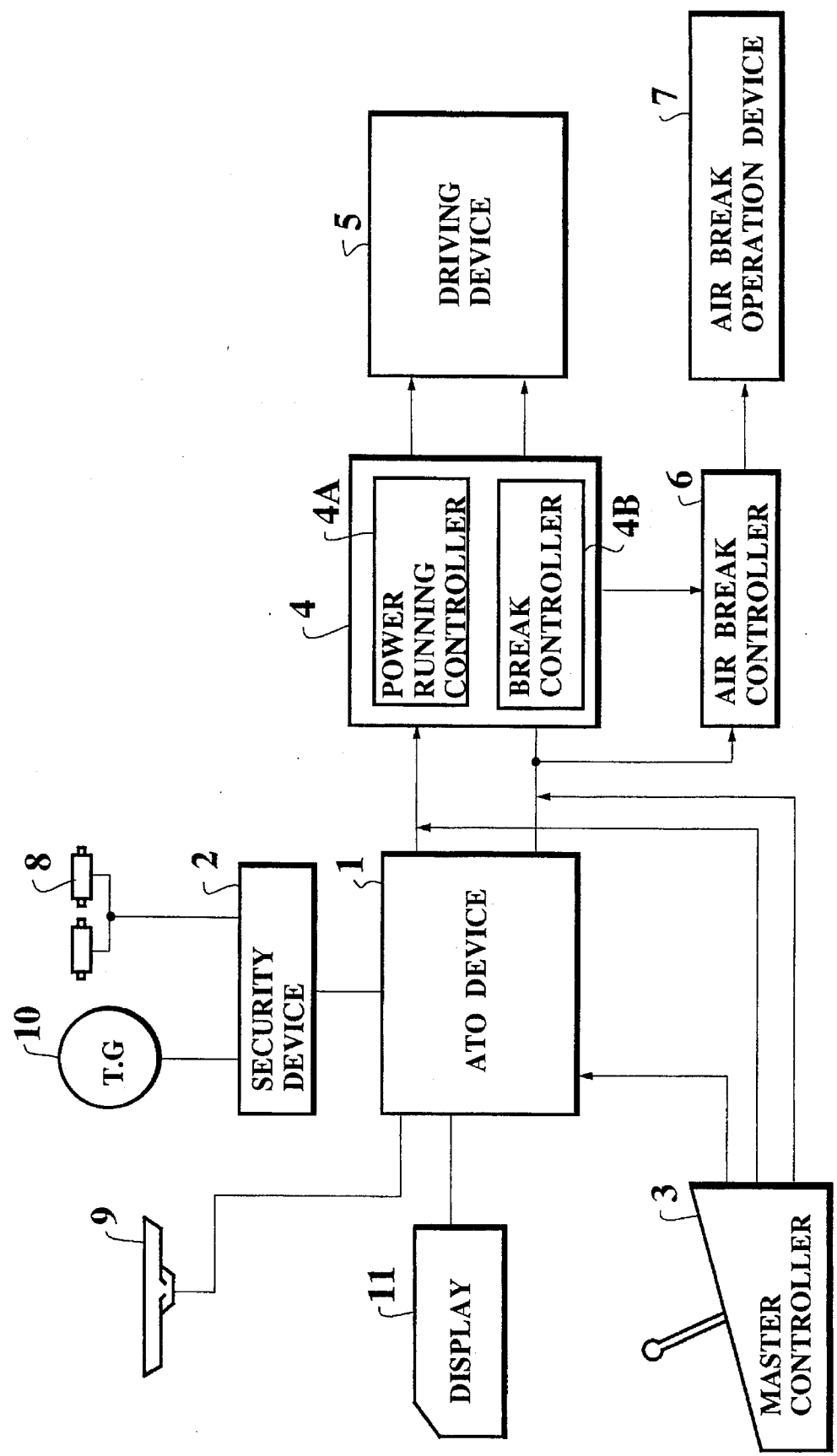
FIG. 1 is a block diagram of a conventional automatic train operation apparatus.
Figure 2:
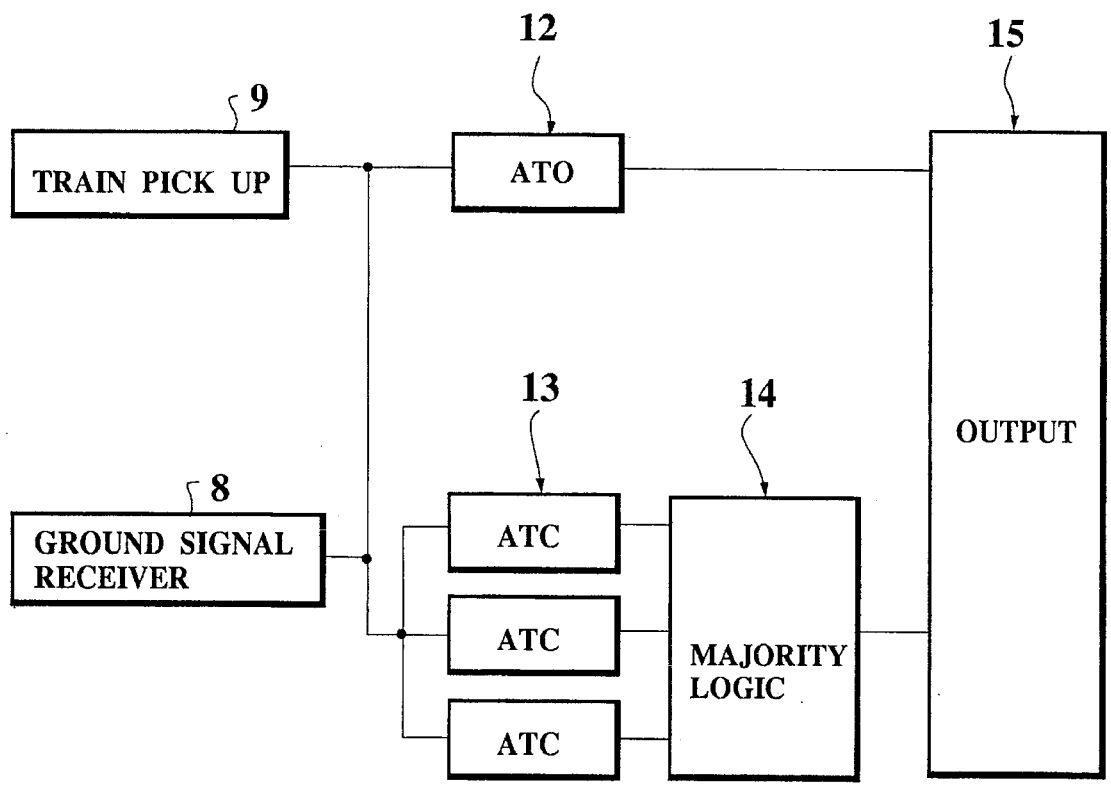
FIG. 2 is a schematic diagram of a conventional automatic train operation device used in the conventional automatic train operation apparatus of FIG. 1.
Figure 3:
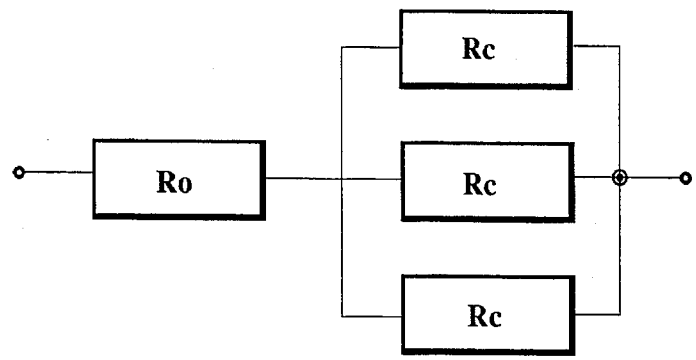
FIG. 3 is a diagram for calculating a total reliability for the conventional automatic train operation device of FIG. 2.
Figure 4:
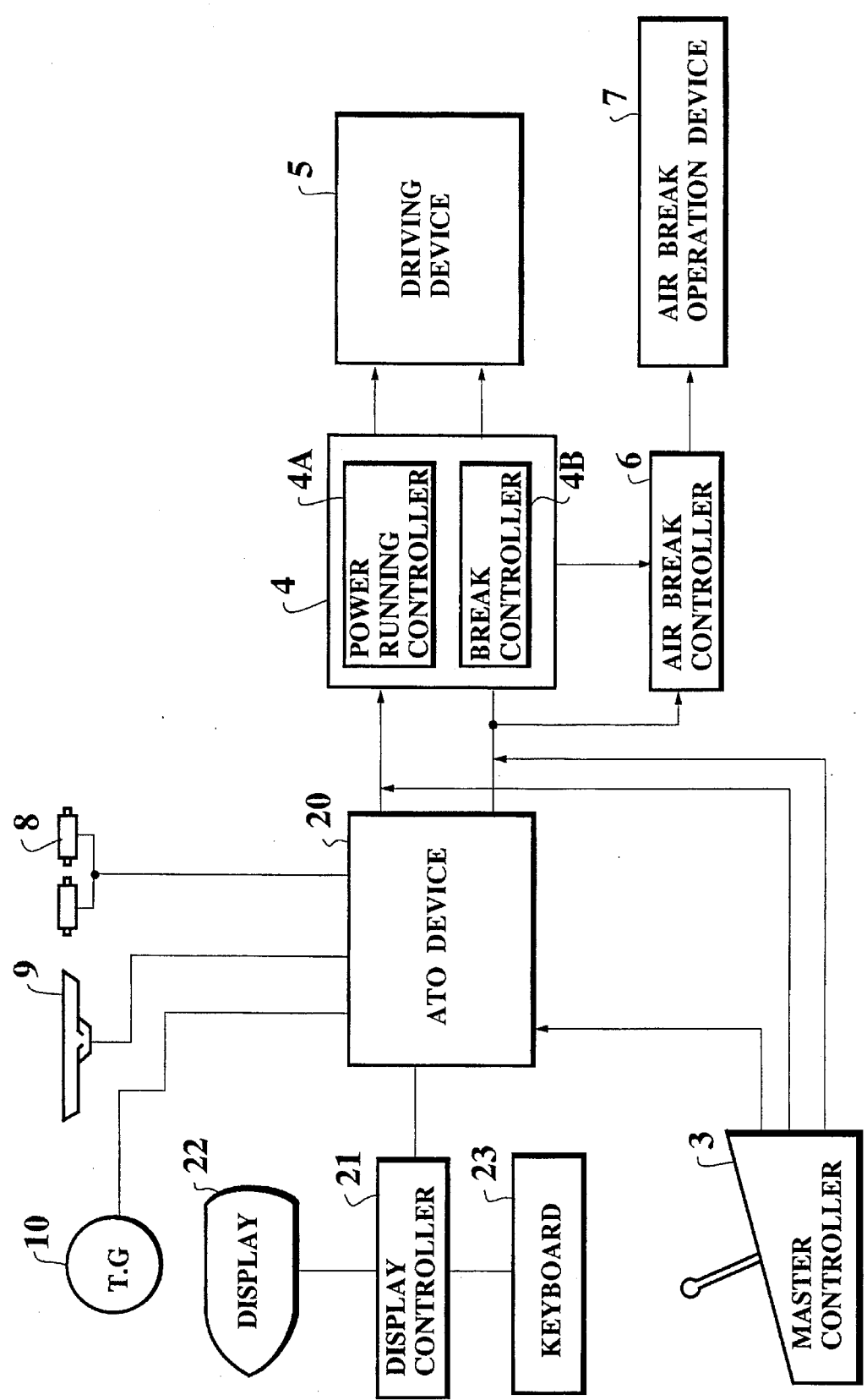
FIG. 4 is a block diagram of one embodiment of an automatic train operation apparatus according to the present invention.

Referring now to FIG. 4, one embodiment of an automatic train operation apparatus according to the present invention will be described in detail.

In this embodiment, an automatic train operation (ATO) apparatus has a configuration shown in FIG. 4, where the apparatus comprises an ATO device 20 incorporating a security function; a master controller 3 for allowing manual train operation control which is connected with the ATO device 20; a control device 4 including a power running controller 4A and a break controller 4B which are controlled by either the ATO device 20 or the master controller 3; a driving device 5 such as a DC motor and an induction motor which is controlled by the control device 4; an air break operation device 7 for operating an air break of a train; an air break controller 6 for activating the air break operation device 7 while monitoring an electric break power so as to control a total break power of a train, which is controlled by either the ATO device 20 or the master controller 3; a ground signal receiver 8 for receiving ground signals from rails which is connected with the ATO device 20; a train pick up 9 for receiving ground terminal signals which is connected with the ATO device 20; a tach generator 10 for generating a train speed signal which is connected with the ATO device 20; a display 22 for displaying a train operation-realized by the ATO device 20; a display controller 21 for controlling the display 22; and a keyboard 23 for entering commands into the display controller 21.

Figure 5:
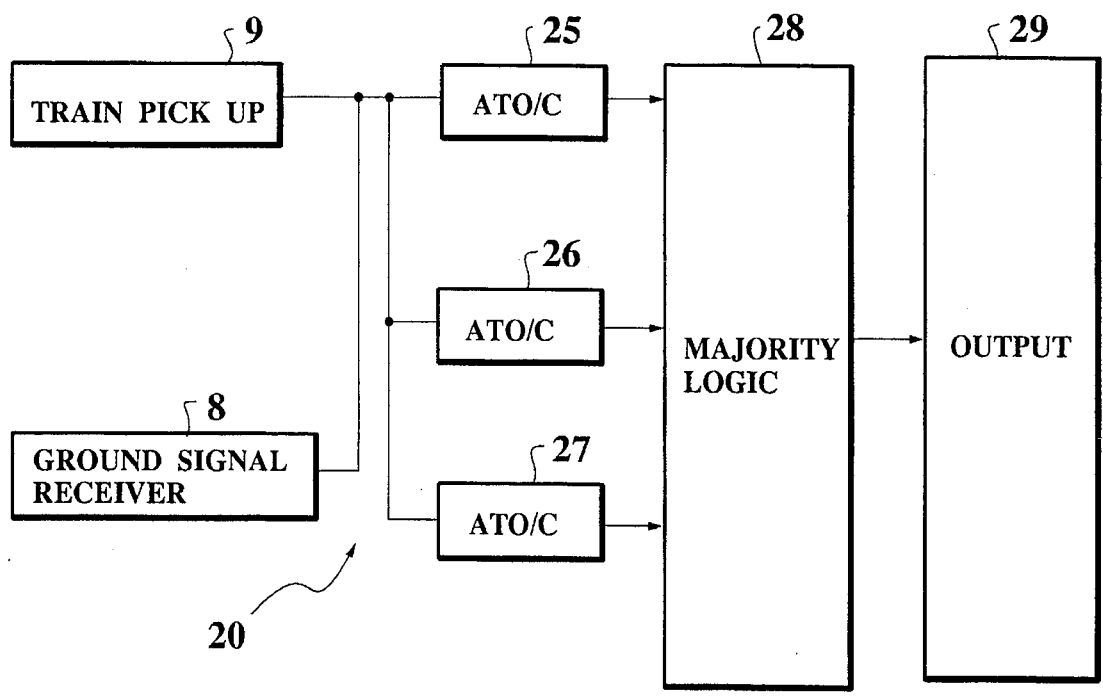
FIG. 5 is a schematic diagram of an automatic train operation device in the automatic train operation apparatus of FIG. 4.

As shown in FIG. 5, the ATO device 20 includes a triple ATO/C unit system formed by three ATO/C units 25, 26, and 27, each of which is capable of functioning as both the ATO and the ATC; a majority logic circuit 28 for determining an output of the triple ATO/C unit system; and an output circuit 29. An improved reliability due to the redundancy can be achieved for the output of the triple ATO/C unit system which is supplied to the output circuit 29 by using the majority logic circuit 28 which operates on the 2-out-of-3 policy.

Figure 6:
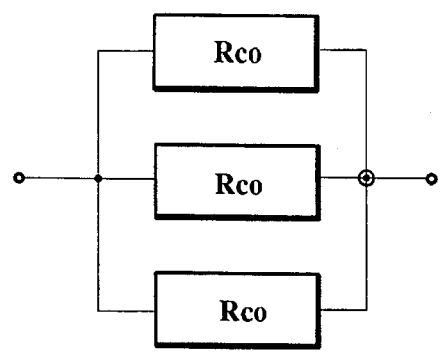
FIG. 6 is a diagram for calculating a total reliability for the automatic train operation device of FIG. 5.

For this ATO device 20 of FIG. 5, a total reliability can be calculated according to a diagram shown in FIG. 6, where a reliability of each ATO/C unit is set equal to $R_{CO}$. This diagram of FIG. 6 indicates that the total reliability R is given by:

$$R = 3R_{CO}^2 - 2R_{CO}^3 \qquad (2)$$

Hence, if $R_{CO}=0.9$ for example, the resulting total reliability would be R=0.972, which is higher than the reliability of each ATO/C unit.

Thus, in this embodiment, the total reliability of the ATO device 20 can be improved compared with the reliability of the components involved in the ATO device 20.

Figure 7:
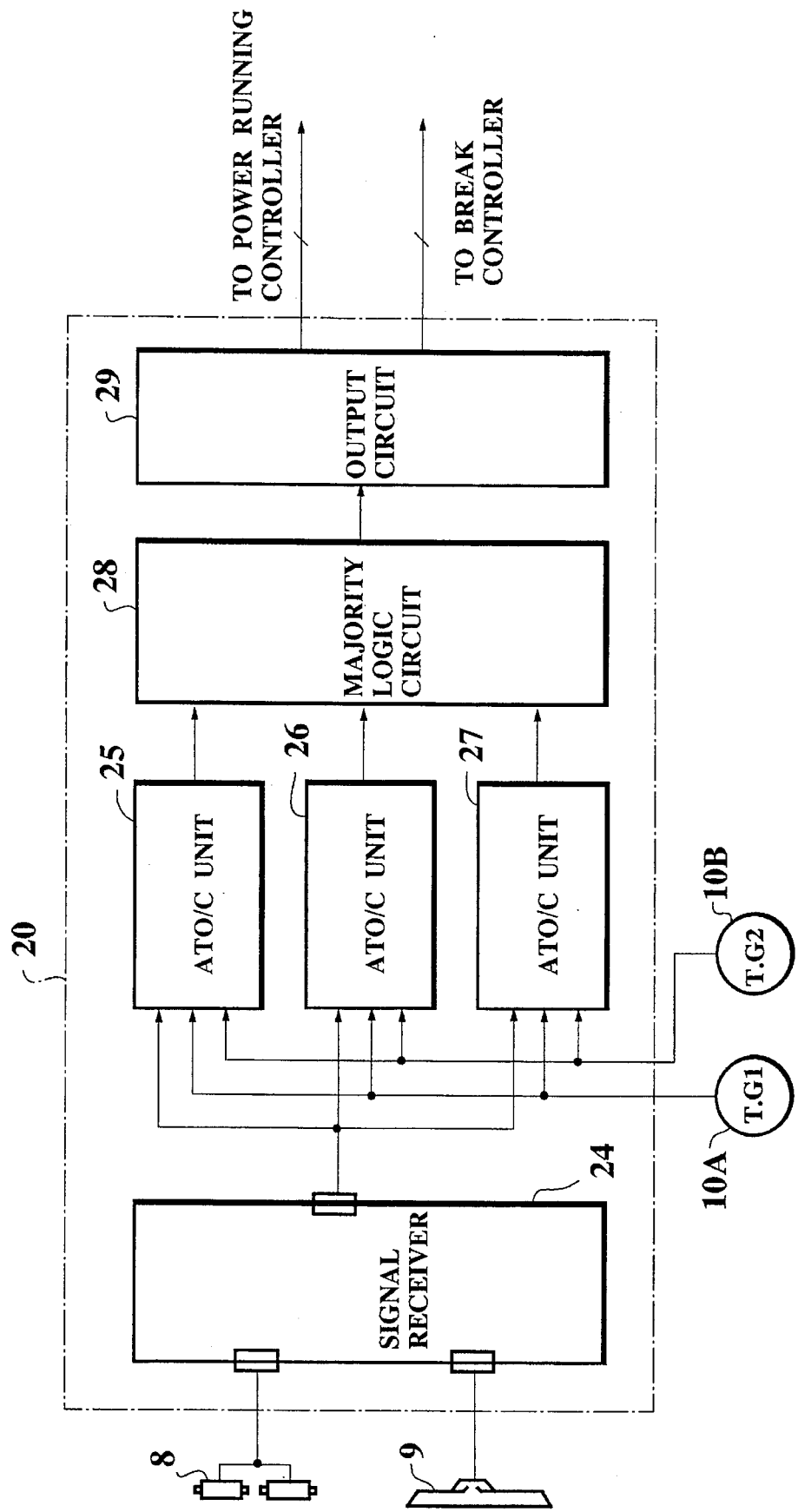
FIG. 7 is a detailed block diagram of the automatic train operation device of FIG. 5.

The ATO device 20 has a detail configuration as shown in FIG. 7, where the ATO device 20 comprises: a signal receiver 24 for receiving the ground signals from the ground signal receiver 8 and the ground terminal signals from the train pick up 9; the triple ATO/C unit system formed by the ATO/C units 25, 26, and 27; the majority logic circuit 28 for determining an output of the triple ATO/C unit system using the 2-out-of-3 policy; and the output circuit 29 for outputting the output of the triple ATO/C unit system determined by the majority logic circuit 28. Each of the ATO/C units 25, 26, and 27 is connected with two tach generators 10A and 10B for supplying the train speed signals. Here, two tach generators 10A and 10B are provided for the purpose of checking the accuracy of the train speed signals supplied by the tach generators 10A and 10B. When the train speed signals supplied by the tach generators 10A and 10B do not coincide, the train speed signal indicating a higher speed will be selected by each of the ATO/C units 25, 26, and 27 for safety purposes.

Figure 8:
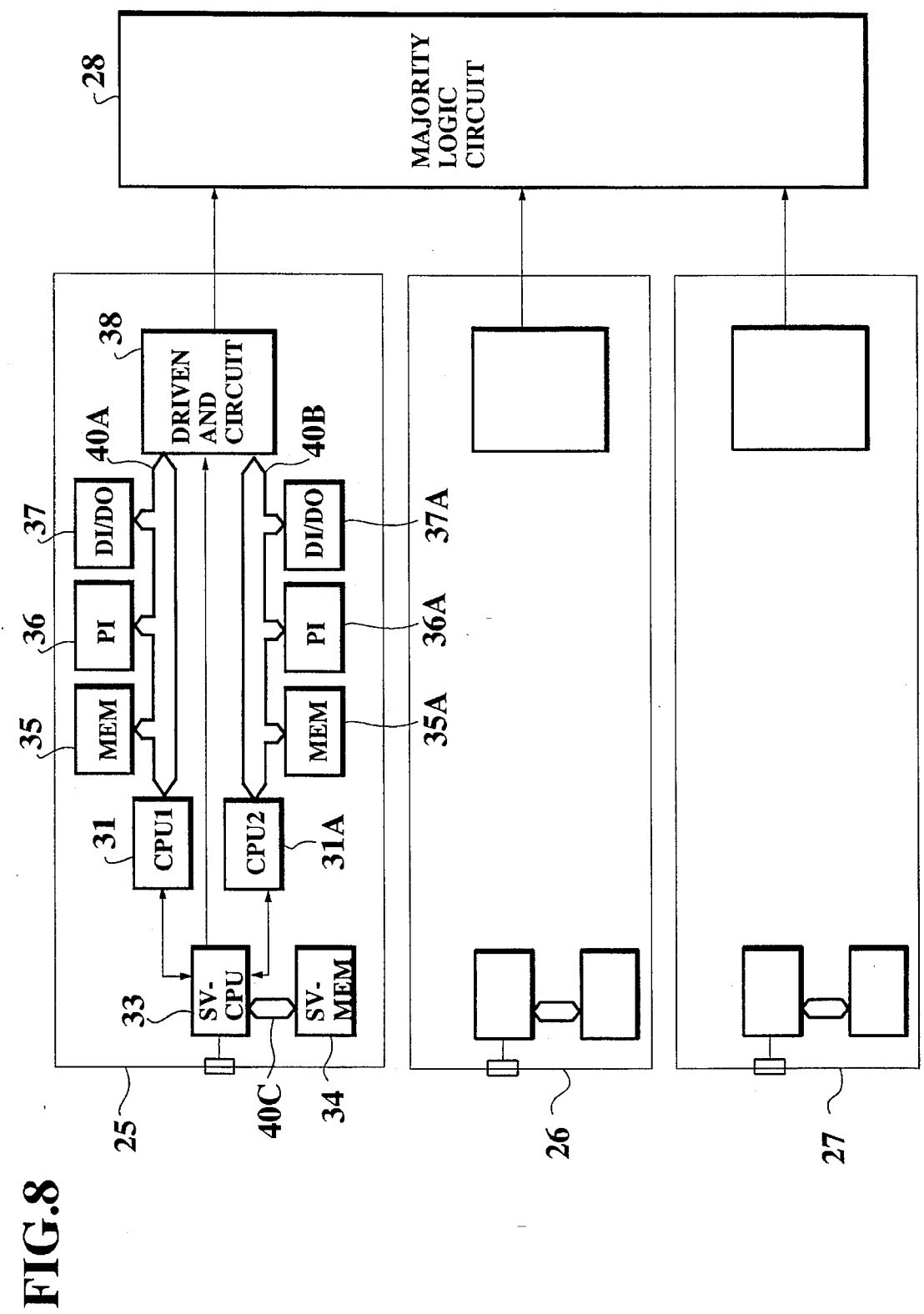
FIG. 8 is a detailed block diagram of ATO/C units in the automatic train operation device of FIG. 5.

Each of the ATO/C units 25, 26, and 27 has a configuration shown in FIG. 8. The details for the ATO/C units 26 and 27 are identical to those of the ATO/C unit 25 so they are not depicted, and their description will also be omitted below.

As shown in FIG. 8, the ATO/C unit 25 comprises: a first computer unit formed by a first microprocessor (CPU1) 31, a memory unit (MEM) 35, a speed pulse input unit (PI) 36, and a digital input and output unit (DI/DO) 37, which are mutually connected by a bus line 40A; a second computer unit formed by a second microprocessor (CPU2) 31A, a memory unit (MEM) 35A, a speed pulse input unit (PI) 36A, and a digital input and output unit (DI/DO) 37A, which are mutually connected by a bus line 40B; a supervisor microprocessor (SV-CPU) 33 for monitoring the operations of the first and second microprocessors 31 and 31A to check whether they are operating normally; a supervisor memory unit (SV-MEM) 34 for storing data to be used by the supervisor microprocessor 33, which is connected with the supervisor microprocessor 33 through a bus line 40C; and a driven AND circuit 38 connected with both of the bus lines 40A and 40B and controlled by the supervisor microprocessor 33 to output an output signal of the ATO/C unit 25 to the majority logic circuit 28. Here, the first and second microprocessors 31 and 31A are operated by an identical program, so that when they are operating normally, the outputs from the bus lines 40A and 40B are identical. The supervisor microprocessor 33 activates the driven AND circuit 38 only when it determines that both of the first and second microprocessors 31 and 31A are operating normally. In addition, when the operations of the first and second microprocessors 31 and 31A disagree with each other, the supervisor microprocessor 33 determines whether this disagreement is a temporary one, or a repeating one, or if caused by a complete malfunction.

Figure 9:
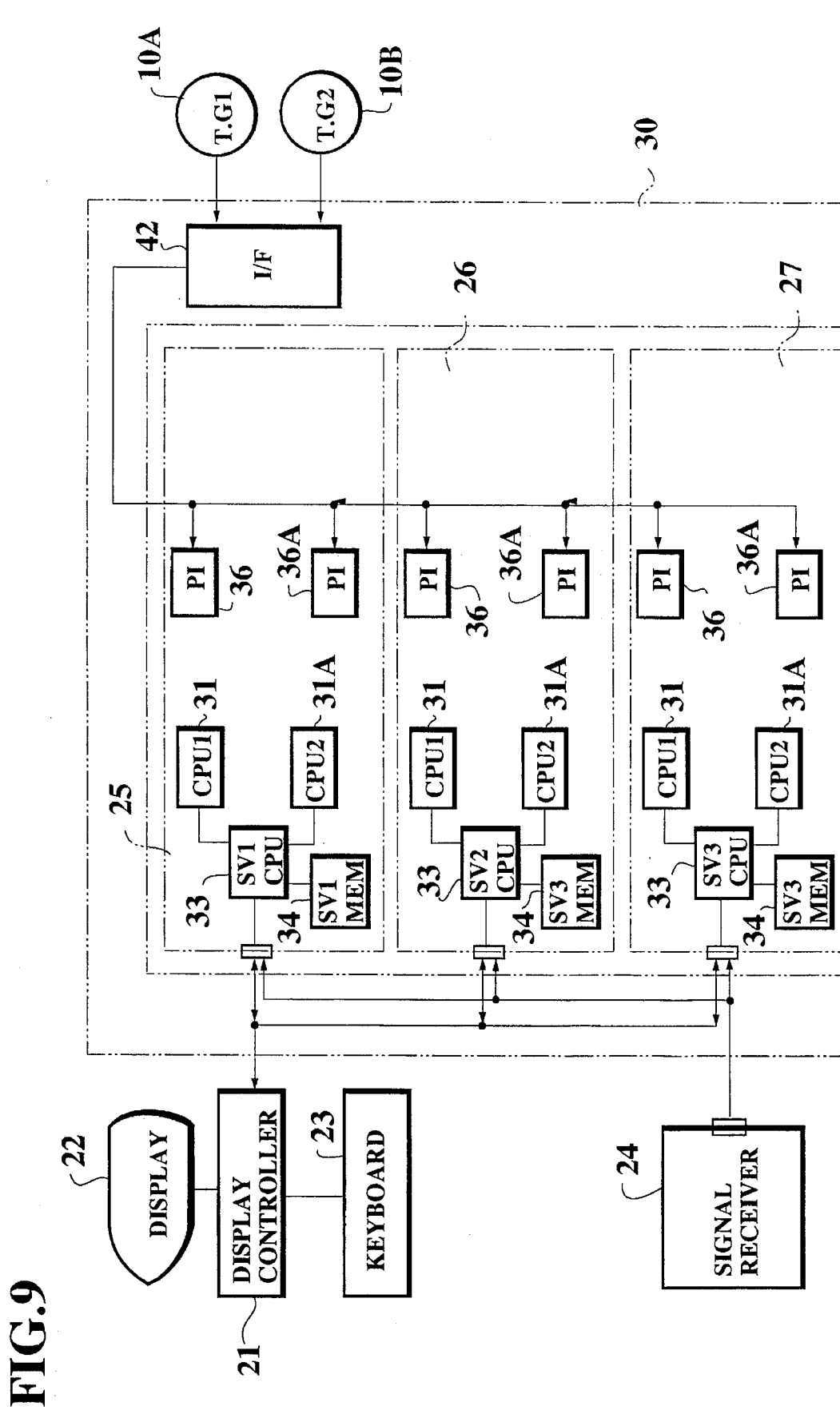
FIG. 9 is a block diagram of the ATO/C units of FIG. 8 with indications of signal flows.

Now, as shown in FIG. 9, the ATO device 20 also includes an interface unit 30 for the ATO/C units 25, 26, and 27. Here, each supervisor microprocessor 33 in each of the ATO/C units 25, 26, and 27 similarly receives the ground signals transmitted from the signal receiver 24 through the interface unit 30, while outputting an output signal to the display controller 21. The output signals from each supervisor microprocessor 33 are also transmitted to the supervisor microprocessors 33 of the other ATO/C units. On the other hand, the train speed signals from the tach generators 10A and 10B are supplied to the speed pulse input units 36 and 36A of each of the ATO/C units 25, 26, and 27 through a speed signal interface circuit 42 in the interface unit 30.

In this embodiment, the ATO device 20 with the configuration described above will operates as follows.

Each supervisor microprocessor 33 in each ATO/C unit supplies the same ground signals to the first and second microprocessors 31 and 31A of this ATO/C unit, while the same train speed signals are supplied simultaneously to the speed pulse input units 36 and 36A of this ATO/C unit, such that the first and second microprocessors 31 and 31A parallelly execute the same program for the automatic train operation. Here, each of the first and second microprocessors 31 and 31A has a capacity sufficient for executing the entire program for the automatic train operation by itself, and two microprocessors are provided in each ATO/C unit in order to realize the fail safe system.

Now, the three supervisor microprocessors 33 of three ATO/C units 25, 26, and 26 operates parallelly, such that in effect, six microprocessors are parallelly executing the same program for the automatic train operation control in the ATO device 20.

In addition, each supervisor micro-processor 33 in each ATO/C unit compares the results obtained by the first and second microprocessors 31 and 31A of one ATO/C unit with the first and second microprocessors 31 and 31A of the other ATO/C units in order to detect any malfunction in the operations of the first and second microprocessors 31 and 31A of each ATO/C unit, and disconnects an ATO/C unit from the other ATO/C units when a malfunction is detected.

Thus, in this embodiment, in addition to having an improved reliability due to the redundancy provided by the triple ATO/C unit system formed by the ATO/C units 25, 26, and 27 in conjunction with the 2-out-of-3 policy adopted by the majority logic circuit 28, an additional security measure is provided in each ATO/C unit which realizes the fail safe system by means of the doubly provided first and second microprocessors 31 and 31A, where each of the first and second microprocessors 31 and 31A has a Capacity sufficient for executing the entire program for the automatic train operation by itself.

Figure 10:
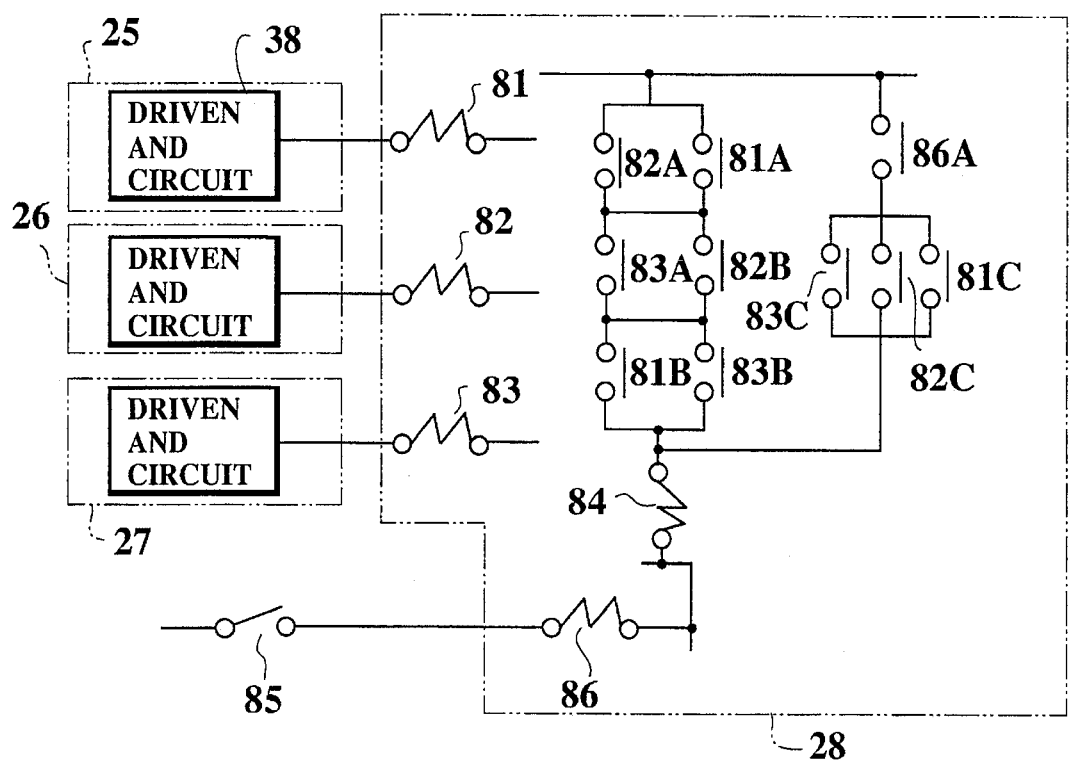
FIG. 10 is a diagram of a modified configuration for a majority logic circuit in the automatic train operation device of FIG. 5.

Now, in the configuration shown in FIG. 7 to FIG. 9, a failure of two ATO/C units in the ATO/C unit system will disable the proper functioning of the ATO device 20 as a whole. However, because of the additional security measure provided by the doubly provided first and second microprocessors 31 and 31A in each ATO/C unit, it is still possible for just one ATO/C unit to execute the appropriate automatic train operation even when two of the ATO/C units in the ATO/C unit system have failed. For this possibility, the configuration of the ATO device 20 may be modified as shown in FIG. 10.

Namely, the driven AND circuit 38 of each of the ATO/C units 25, 26, and 27 controlled by the respective supervisor microprocessor 33 is made to operate channel relays 81, 82, and 83 for indicating that the respective ATO/C unit is operating normally. In correspondence to such channel relays 81, 82, and 83, the majority logic circuit 28 has a configuration in which a junction 81A for the channel relay 81 and a junction 82A for the channel relay 82 are connected in parallel, a Junction 82B for the channel relay 82 and a junction 83A for the channel relay 83 are connected in parallel, a junction 83B for the channel relay 83 and a junction 81B for the channel relay 81 are connected in parallel. These parallelly connected junctions are connected in series with each other and connected to a system operation relay 84, which is a well known configuration for the 2-out-of-3 system.

In this configuration of the majority logic circuit 28, even when the Junctions involving the junctions 81A and 81B are disconnected as a result of the breakdown of the channel relay 81 for example, the system operation relay 84 can still be operational as the remaining junctions 82A, 82B, 83A, and 83B are connected.

In addition, the ATO device 20 can be modified to remain operative even when two of the ATO/C units 25, 26, and 27 fail, by additionally providing a continuation switch 85 to be connected by a manually entered command, a continuation check relay 86 connected with this continuation switch 85, the system operation relay 84, and additional connection to the system operation relay 84 formed by three junctions 81C, 82C, and 83C of the channel relays 81, 82, and 83. The three junctions 81C, 82C, and 83C are connected in parallel with each other and in series with the system operation relay 84 and a junction 86A for the continuation check relay 86, such that the system can remain in operation even when two of the ATO/C units 25, 26, and 27 fail because the presence of the continuation switch 85, which is manually closed in such a case, allows the 2-out-of-3 policy of the majority logic circuit 28 to be satisfied.

Figure 11:
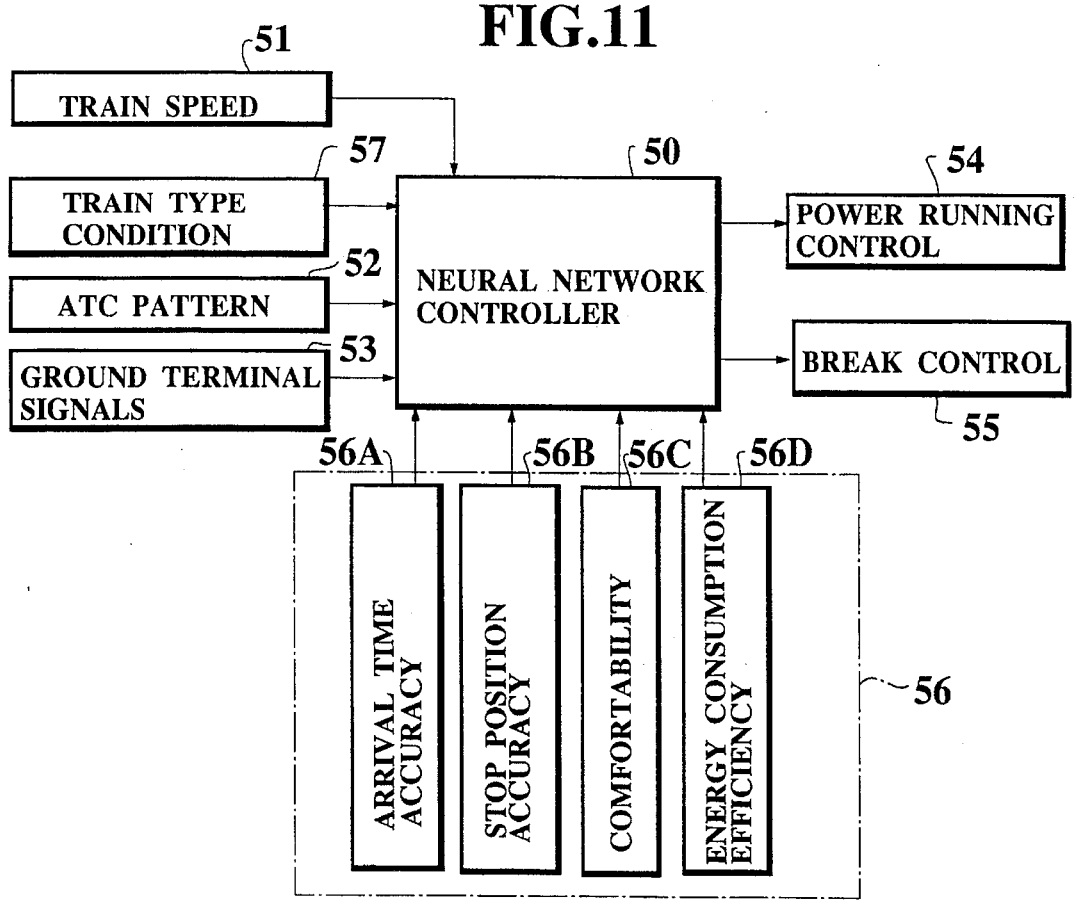
FIG. 11 is a diagram of a software configuration for microprocessors in the ATO/C units of FIG. 8.

Referring to FIG. 11, a software configuration for the automatic train operation to be executed by each of the microprocessors 31 and 31A in each ATO/C unit of the ATO device 20 will be described in detail.

In this software configuration shown in FIG. 11, a neural network controller 50 receives a speed information 51, an ATC pattern 52, ground terminal signals 53 which are to be used in carrying out a train automatic stop control (TASC), and a train type condition 57, according to which a power running control 54 and a break control 55 are carried out. In addition to controlling the train to start and stop at predetermined positions, this ATO device 20 also evaluates the quality of automatic train operation in terms of qualitative or quantitative factors called evaluation function 56 which includes an arrival time accuracy factor 56A, a stop position accuracy factor 56B, a comfortability factor 56C, and an energy consumption efficiency factor 56D. In other words, the neural network controller 50 has a so called learning function in which the control is gradually adjusted after each operation toward an ideal control.

The neural network is a circuitry for simulating human brain functions, in which the accuracy of the simulation can be improved gradually by means of the learning.

Figure 12:
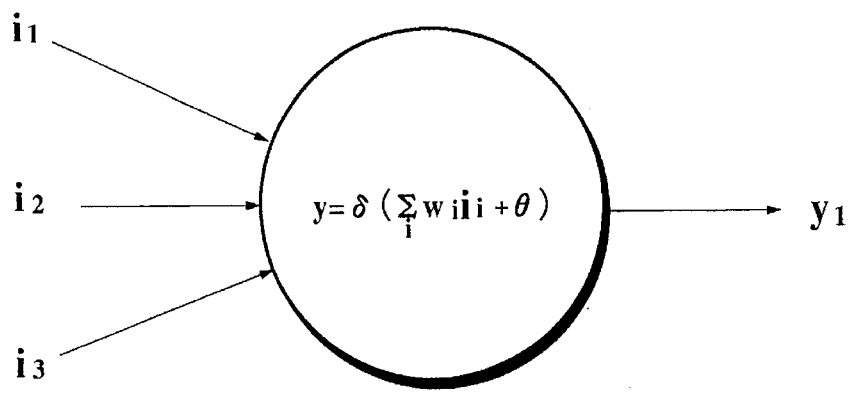
FIG. 12 is a schematic diagram of a neuron model for a neural network used in the software configuration of FIG. 11.

Such a neural network is constructed from a plurality of neurons, and an example of a neuron model to be used in such a neural network is shown in FIG. 12, where the neuron generates an output $y_1$ as a weighted sum of a plurality of inputs $i_1$, $i_2$, and $i_3$ multiplied by appropriate weight factors $w_i$.

Figure 13:
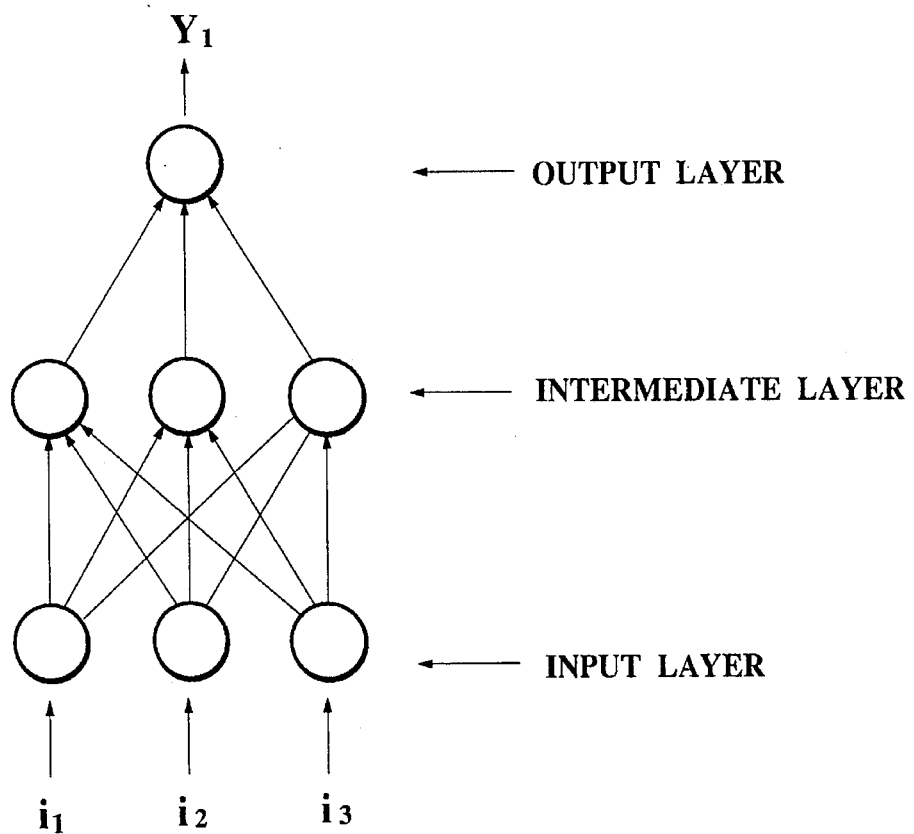
FIG. 13 is a schematic diagram of a neural network used in the software configuration of FIG. 11.

An example of a hierarchical structure to be used in such a neural network is shown in FIG. 13 where the network includes an input layer, an intermediate layer, and an output layer, by which a value for $y=\delta(\Sigma w_i+\theta)$ is calculated from a plurality of inputs $i_1$, $i_2$, and $i_3$, where the values of w and $\theta$ are gradually adjusted to make a difference between the calculated y and the desired y as small as possible. In this embodiment, the quantities such as speed, current notch, load, number of train cars, and ATC signal are given as inputs, and the power running notch and the break notch are obtained as outputs.

The actual automatic train operation to be executed by each of the microprocessors 31 and 31A in each ATO/C unit of the ATO device 20 will now be described in detail.

Figure 14:
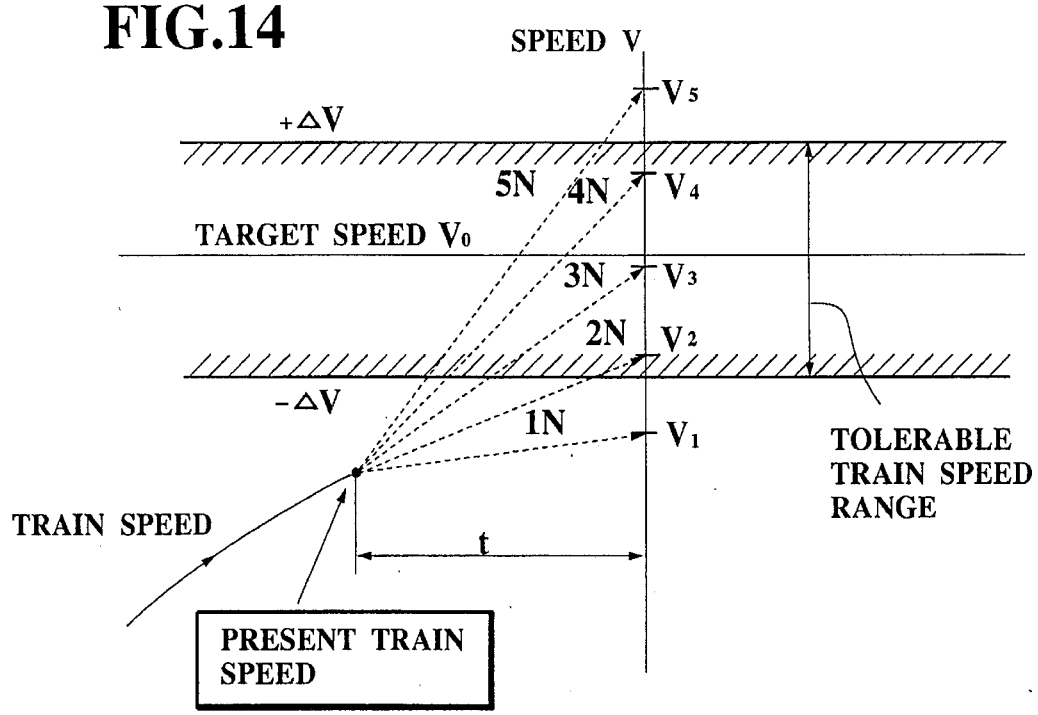
FIG. 14 is a train speed diagram for a power running control to be realized by the software configuration of FIG. 11.

First, a case of controlling a power running notch output to the power running controller 4A on a basis of a resulting train speed estimation during a power running state will be described with reference to FIG. 14.

Namely, from a present train speed, a train speed after a prescribed period of time t for each possible power running notch output is estimated, and the power running notch output for which the estimated train speed is closest to the target train speed $V_0$ is selected, in principle. In practice, when the estimated train speed for the present power running notch is within a tolerable train speed range, the present power running notch is maintained, whereas the power running notch output is shifted to that for which the estimated train speed is closest to the target train speed $V_0$ which is at a middle of the tolerable train speed range. For example, if the present power running notch is 2N, 3N, or 4N, the present power running notch is maintained, whereas if the present power running notch is 1N or 5N, the power running notch output is shifted to 3N for which the estimated train speed is closest to the target train speed $V_0$.

In such a basic power running notch output control, when the estimated train speed is inaccurate, or when the resulting value for the evaluation function is largely deviated from a desired value, the selection of the power running notch output or the power running notch output timing is changed, such that the actual train speed is controlled to take a value which increasingly approaches the target train speed $V_0$.

Next, a case of controlling a stop timing will be described with reference to FIG. 15.

In a case of stopping the train, a resulting stop position for each possible breaking notch is estimated on a basis of the present train speed at each moment, and a breaking notch for which the estimated stop position is closest to the target stop position is selected, in principle. In practice, when the estimated stop position for the present breaking notch is within a tolerable stop position range, the present breaking notch is maintained, whereas the breaking notch is shifted to that for which the estimated stop position is closest to the target stop position Which is at a middle of the tolerable stop position range. For example, if the present breaking notch is 4N, 5N, or 6N, the present breaking notch is maintained, whereas if the present breaking notch is 3N or 7N, the breaking notch is shifted to 5N for which the estimated stop position is closest to the target stop position.

In such a basic breaking notch controlling, when the estimated stop position is inaccurate, or the resulting value for the evaluation function is largely deviated from a desired value, the selection of the breaking notch or the breaking notch output timing is changed, such that the actual stop position is controlled to take a position which increasingly approaches the target stop position.

Next, an overall train speed control pattern will be described with reference to FIG. 16.

Figure 16:
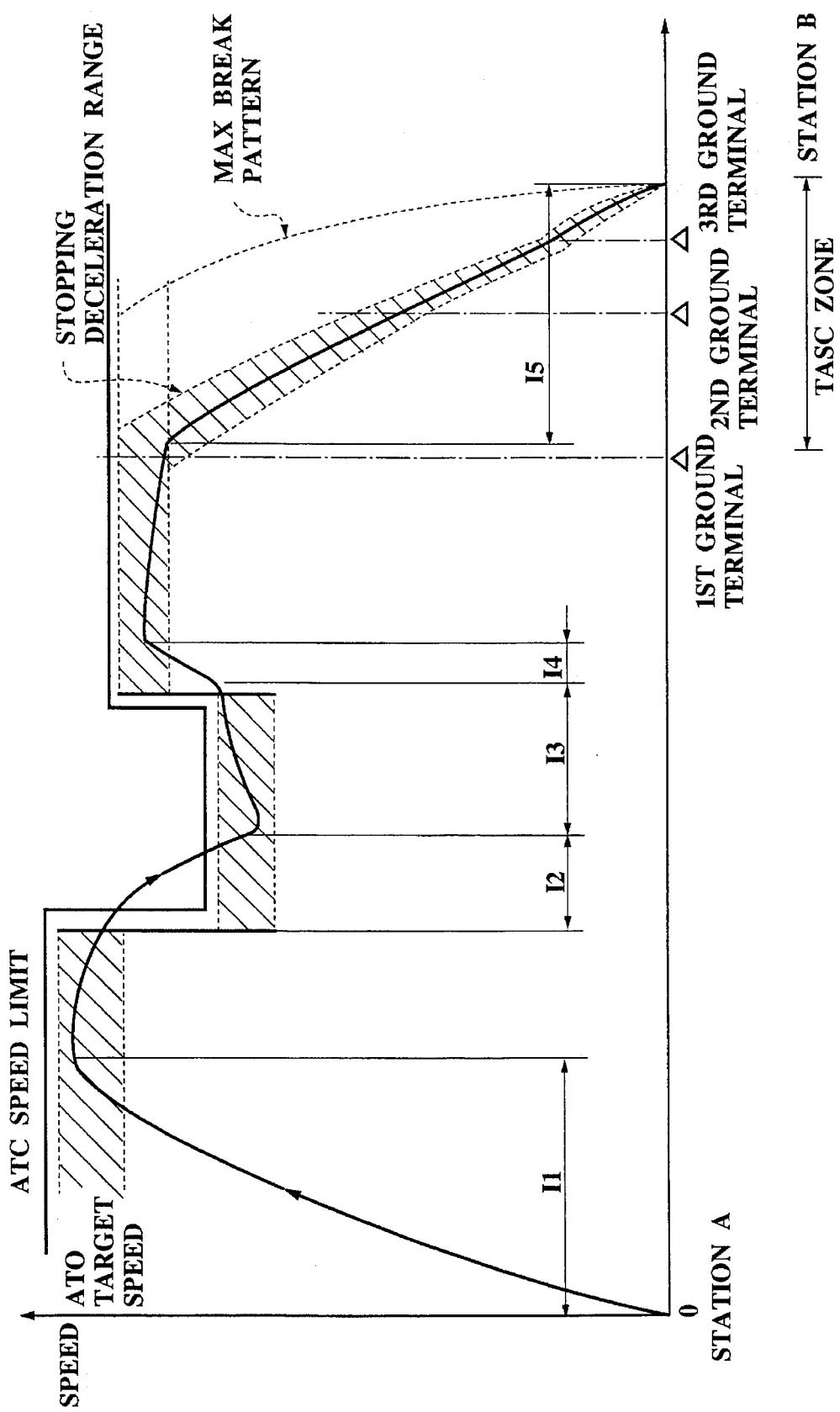
FIG. 16 is a train speed diagram of an overall train speed control pattern to be realized by the software configuration of FIG. 11.

FIG. 16 shows a typical overall train speed control pattern for a case of operating the train from a station A to a station B. In this overall train speed control pattern of FIG. 16, the interval I1 is a power running control interval in which the power running notch output control, such as that shown in FIG. 14, is carried out. The interval I2 is a breaking interval in which the break is applied as the train speed is exceeding the ATC speed limit. Here, in a conventional ATO apparatus in which the ATO and ATC are provided separately, the ATC break has a fixed breaking notch such as 7N, but in the ATO apparatus of this embodiment, the breaking notch can be selected according to the situation. Intervals I3 and I4 are the power running control intervals like the interval I1, while the interval I5 is a TASC interval which will be described in detail below. The remaining intervals are inertial running intervals in which neither the power running notch nor the breaking notch is outputted. Throughout this overall train speed control pattern, each of the microprocessors 31 and 31A in each ATO/C unit of the ATO device 20 continuously calculates the train speed and the running distance, and controls the train speed by selecting the most appropriate power running notch or breaking notch to maintain the train speed within the ATO target speed range.

Now, the control in the TASC interval I5 will be described with reference to FIG. 17.

Figure 17:
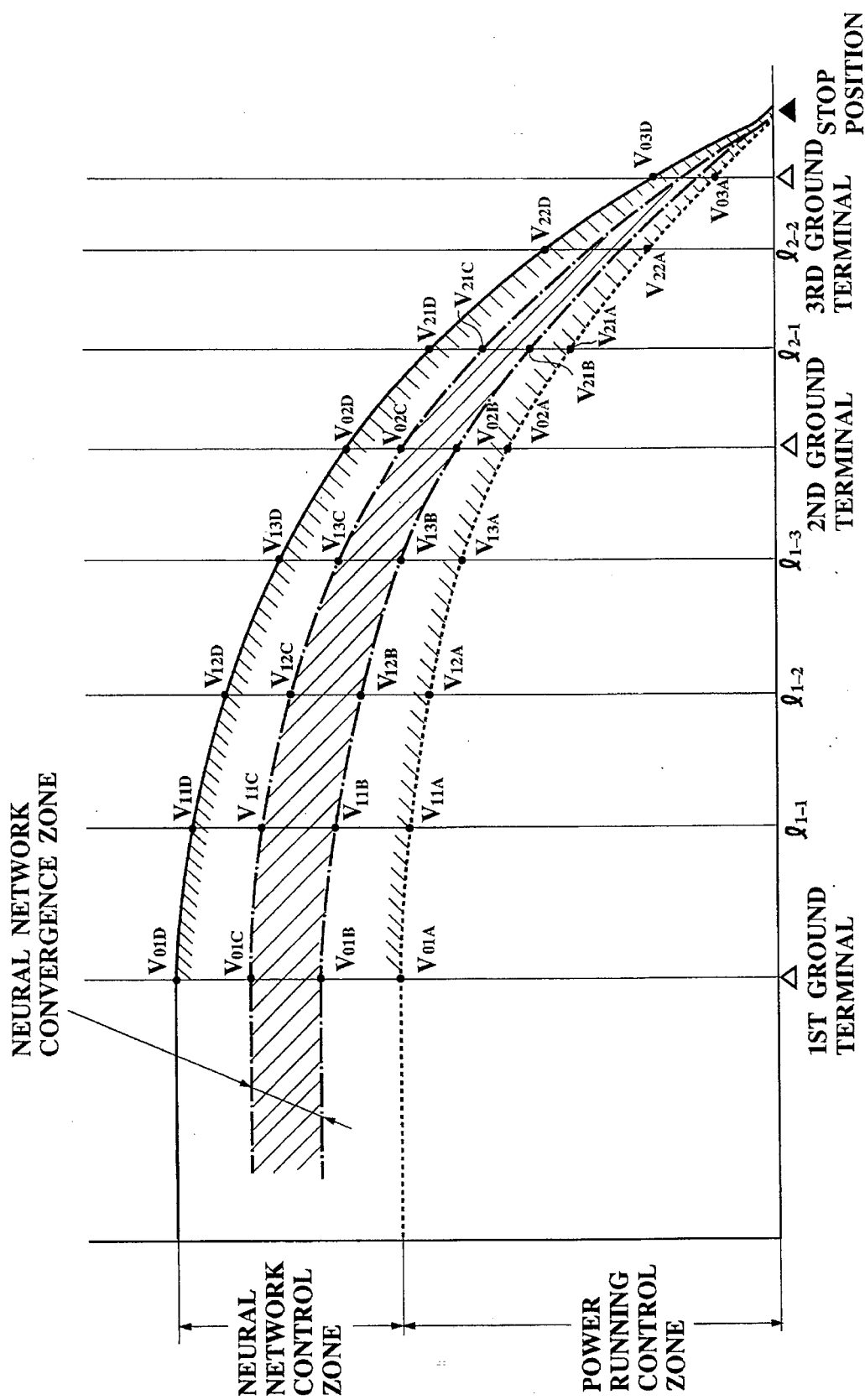
FIG. 17 is a train speed diagram of a train automatic stop control (TASC) to be realized by the software configuration of FIG. 11.

In the TASC interval shown in FIG. 17, there are provided three ground terminals. The first ground terminal is for notifying the ATO apparatus that the train has entered the TASC interval, the second ground terminal is for indicating an estimation point, and the third ground terminal is for indicating a final point.

In passing the first ground terminal, each of the microprocessors 31 and 31A in each ATO/C unit of the ATO device 20 confirms that the train speed is within the stopping deceleration range between $V_{\emptyset1A}$ and $V_{\emptyset1D}$ which defines a neural network control zone. When the train passes the first ground terminal at the train speed lower than those within the neural network control zone, the train speed is brought up into the neural network control zone by carrying out the power running control.

After passing the first ground terminal, each of the microprocessors 31 and 31A in each ATO/C unit of the ATO device 20 sequentially estimates and confirms that the train speed is within the neural network control zone which is sequentially defined between $V_{11A}$ and $V_{11D}$, $V_{12A}$ and $V_{12D}$, and $V_{13A}$ and $V_{13D}$ at estimated sequential train positions $l_{1-1}$, $l_{1-2}$, and $l_{1-3}$.

In passing the estimation point indicated by the second ground terminal, each of the microprocessors 31 and 31A in each ATO/C unit of the ATO device 20 confirms that the train speed is within the neural network control zone between $V_{\emptyset2A}$ and $V_{\emptyset2D}$, while also correcting a deviation of the estimated train position with respect to the actual train position indicated by the second ground terminal.

After passing the second ground terminal, each of the microprocessors 31 and 31A in each ATO/C unit of the ATO device 20 sequentially estimates and confirms that the train speed is within the neural network control zone which is sequentially defined between $V_{21A}$ and $V_{21D}$ and $V_{22A}$ and $V_{22D}$ at estimated sequential train positions $l_{2-1}$ and $l_{2-2}$.

Figure 15:
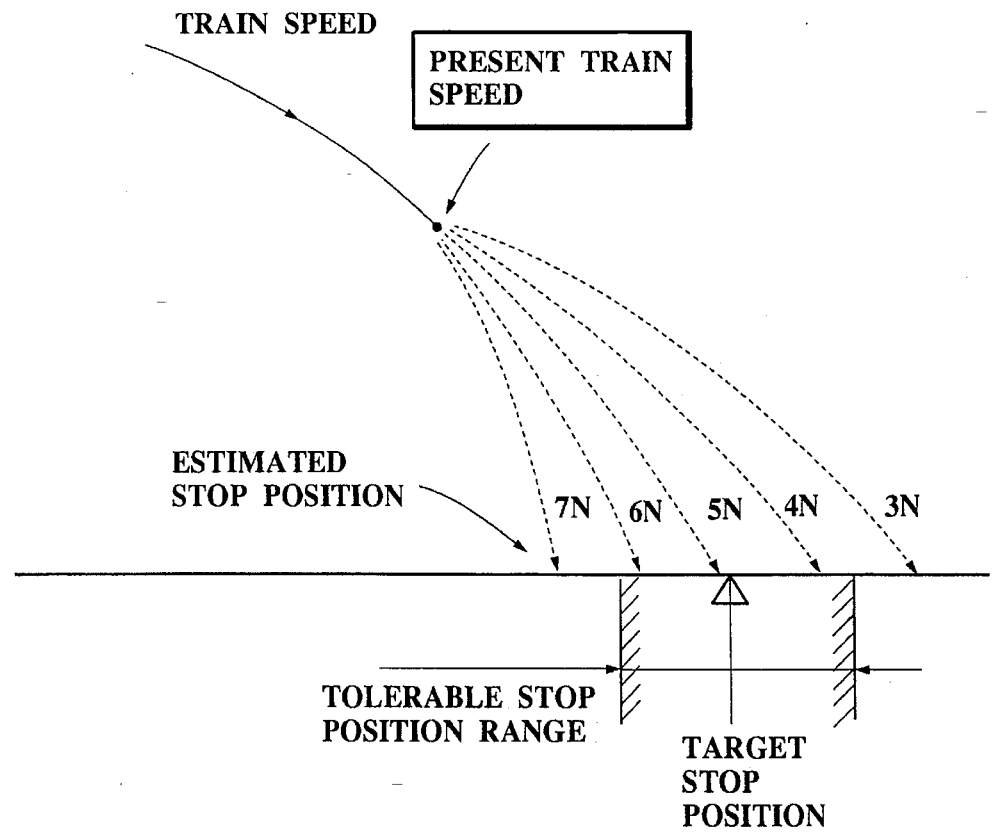
FIG. 15 is a train speed diagram of a stop timing control to be realized by the software configuration of FIG. 11.

Then, after passing the final point indicated by the third ground terminal, each of the microprocessors 31 and 31A in each ATO/C unit of the ATO device 20 carries out the stop timing control such as that shown in FIG. 15.

In this embodiment, the neural network not only controls the train speed according to the tolerable train speed range, but also evaluates the quality of the automatic train control by using the evaluation function, so that the train speed is actually controlled to gradually to within a neural network convergence zone shown in FIG. 17.

Now, a detail procedure for the automatic train operation to be executed by each of the microprocessors 31 and 31A in each ATO/C unit of the ATO device 20 will be described with reference to a flowchart of FIG. 18.

First, the ATO device 20 checks the initial conditions to confirm that the train is in a running condition at the step 110. Then, step 120 determines whether a running start command is issued.

When it is determined that the running start command is issued at the step 120, each of the microprocessors 31 and 31A in each ATO/C unit of the ATO device 20 starts the real time calculation processings for the train speed, running distance, electric power, acceleration, deceleration, etc. at the step 130. Here, the calculation processings also include train speed correction due to the wheel diameter correction, and the electric power calculation using the measured values of cable voltage and cable current.

Next, according to the results of the various calculation processings obtained at the step 130, a train control operation, which is a core of this automatic train operation, is carried out at the step 140 including the four steps 142, 144, 146, and 148.

First at the step 142, a present running state at each point in the obtained processing result is checked, and then at the step 144, the evaluation function is checked. Next, at the step 146, the present running pattern curve is compared with the past superior running pattern curve for the same section which has been designated as being superior in terms of the evaluation function, and then at the step 148, the command output is actually outputted according to the neural network control.

This train control operation at the step 140 will be described in further detail below.

Then, at the steps 150, 160, and 170, whether the command output from the train control operation 140 is a power running notch command, an inertial running command, or a breaking notch command is determined, respectively and when the command output is none of these, a malfunction of the system is detected at the step 180.

On the other hand, when the command output is determined to be one of the power running notch command, inertial running command, and breaking notch command, the ATC speed limit is checked at step 190, and at the step 200, the train speed limitations such as slope limitation and speed curve limitation are checked.

Then, at the step 210, it is determined whether the train has entered the TASC zone by detecting the ground terminal signals from the first ground terminal. When the train is not in the TASC zone yet, the process from the step 130 is repeated, whereas when the train has entered the TASC zone, the second ground terminal, third ground terminal, and the stopping of the train are checked respectively at the steps 220, 230, and 240 while carrying out the train automatic stop control of FIG. 17 described above.

After it is determined that the train has stopped at the step 240, the ATO device 20 carries out the checking of the final processing results at the step 250, the final checking by using the evaluation function at the step 260, and the selection and recording of the superior running pattern curve at the step 270.

Figure 18:
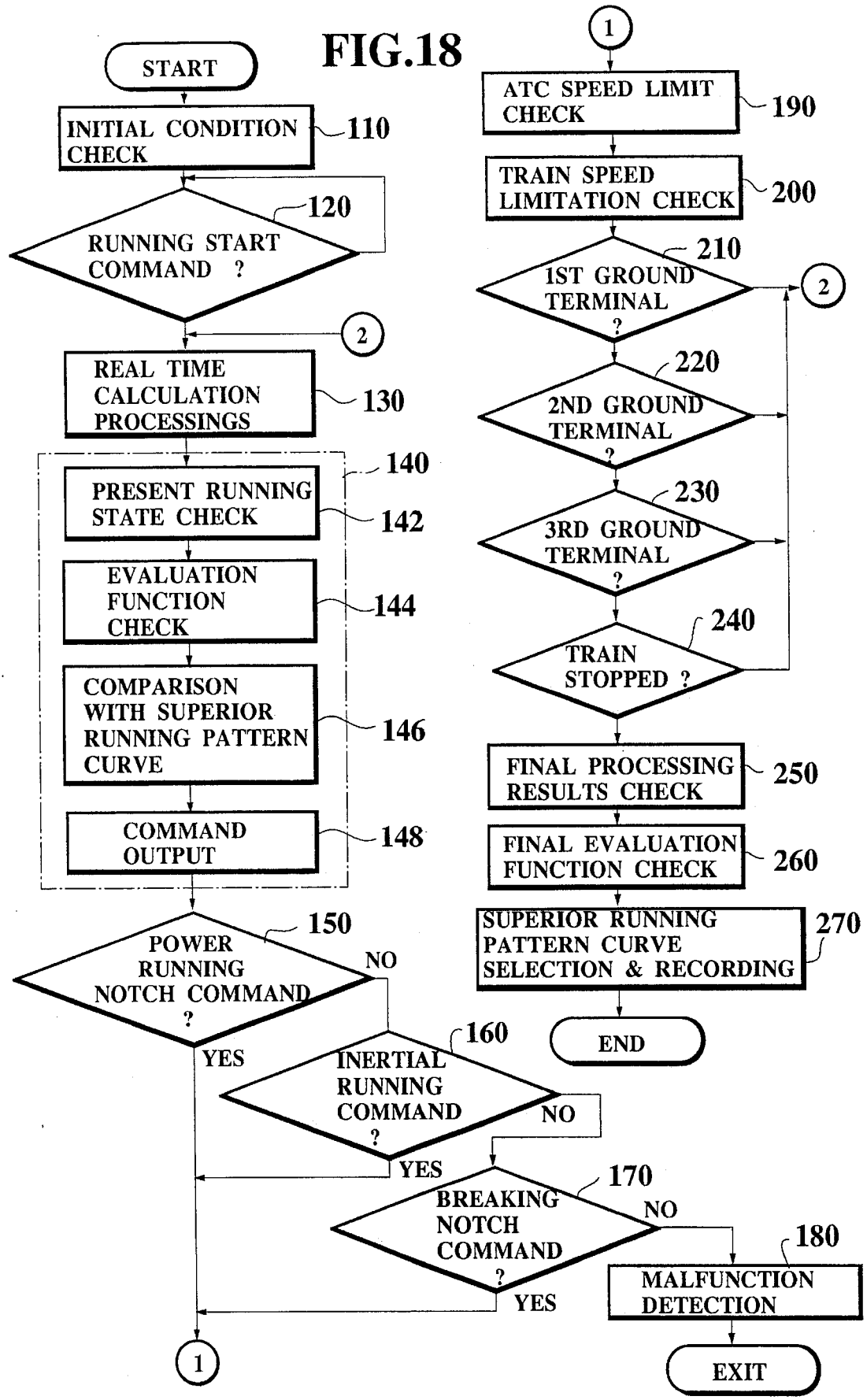
FIG. 18 is a flowchart for a procedure of the automatic train control to be carried out by the automatic train operation device of FIG. 5.
Figure 19:
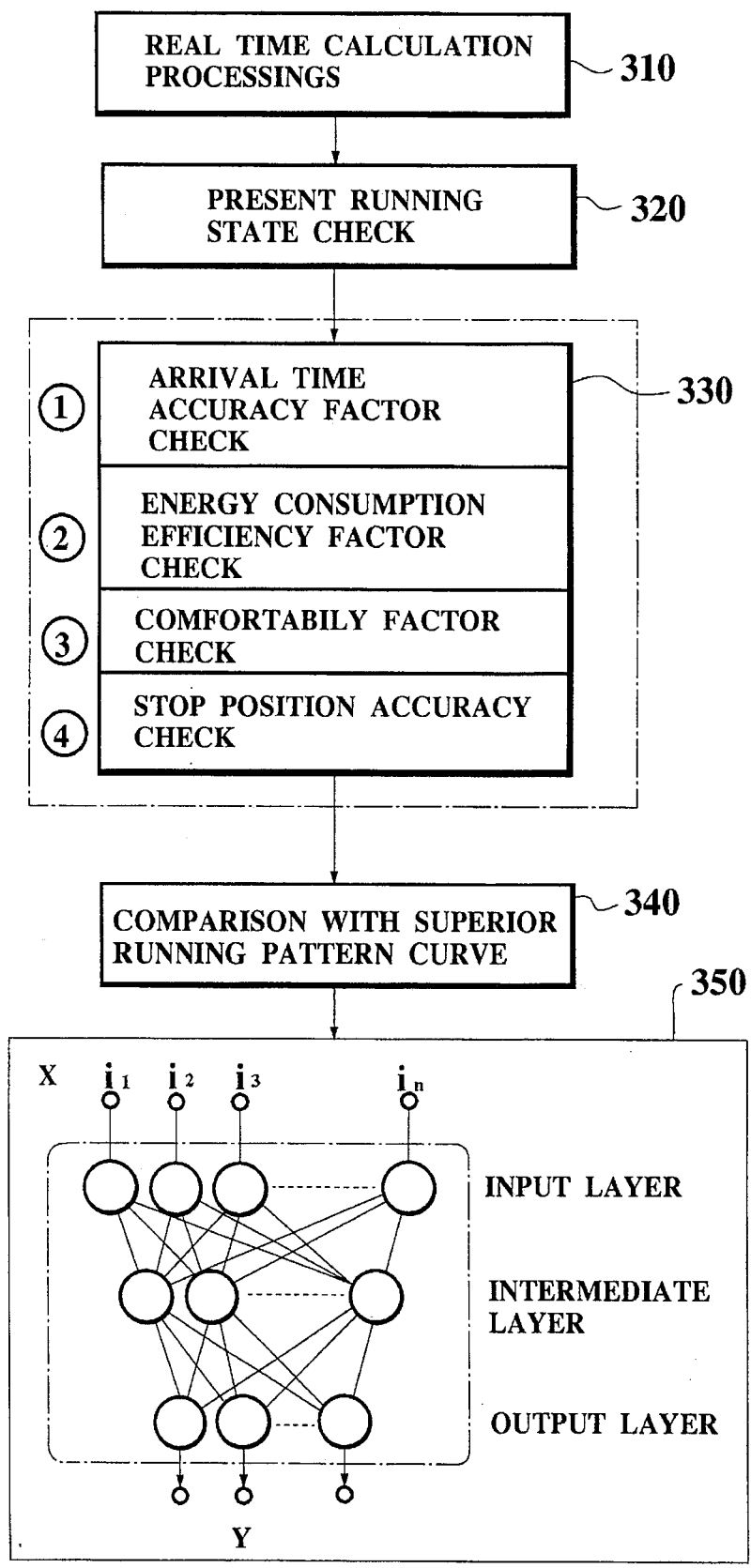
FIG. 19 is a detailed flowchart for a train control operation in the procedure of FIG. 18.

The train control operation at the step 140 in the flowchart of FIG. 18 is carried out in further detail according to the flowchart shown in FIG. 19 as follows.

First, at the step 310, each of the microprocessors 31 and 31A in each ATO/C unit of the ATO device 20 carries out the real time calculation processings for the train speed, distance, electric power, acceleration, deceleration, etc.

Figure 20:
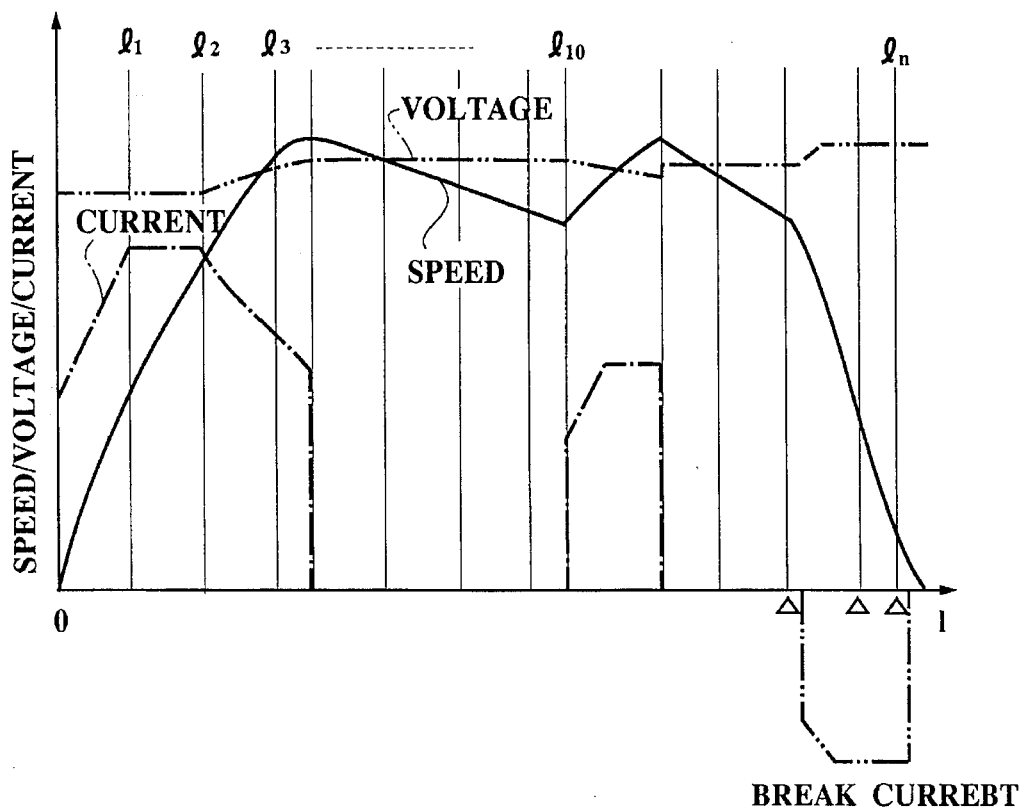
FIG. 20(A) is a diagram of quantities calculated by the microprocessors of the automatic train control device of FIG. 5 in the procedure of FIG. 18.
FIG. 20(B) is a train speed diagram of ideal running pattern curves for various factors of evaluation functions used in the procedure of FIG. 18.
FIG. 20(C) is a train speed diagram of a superior running pattern curve used in the procedure of FIG. 18.
FIG. 20(D) is a train speed diagram of a comparison of a present running pattern curve and an appropriate running pattern curve in the procedure of FIG. 18.
Figure 20:
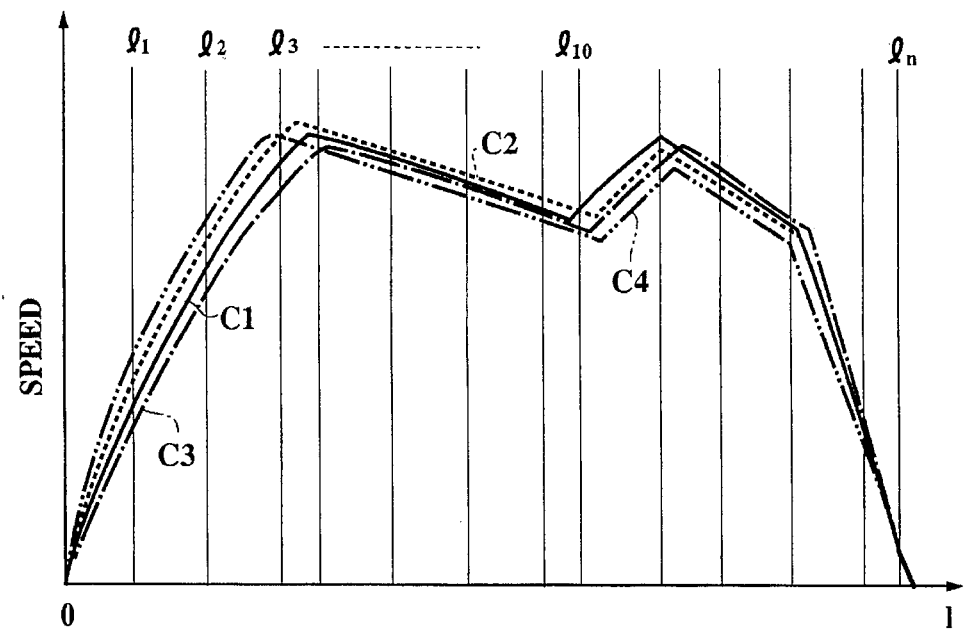
Figure 20:
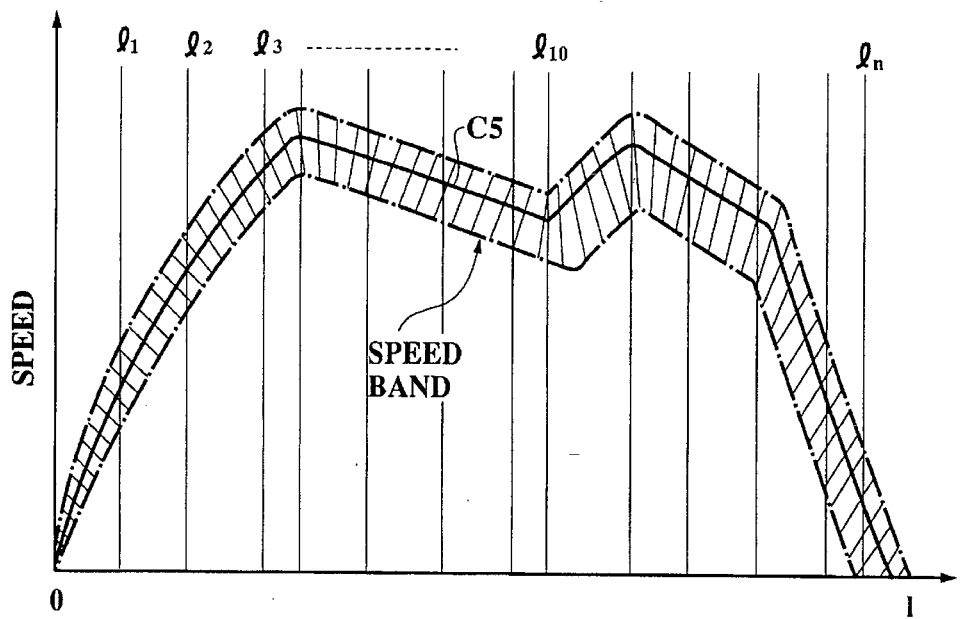
Figure 20:
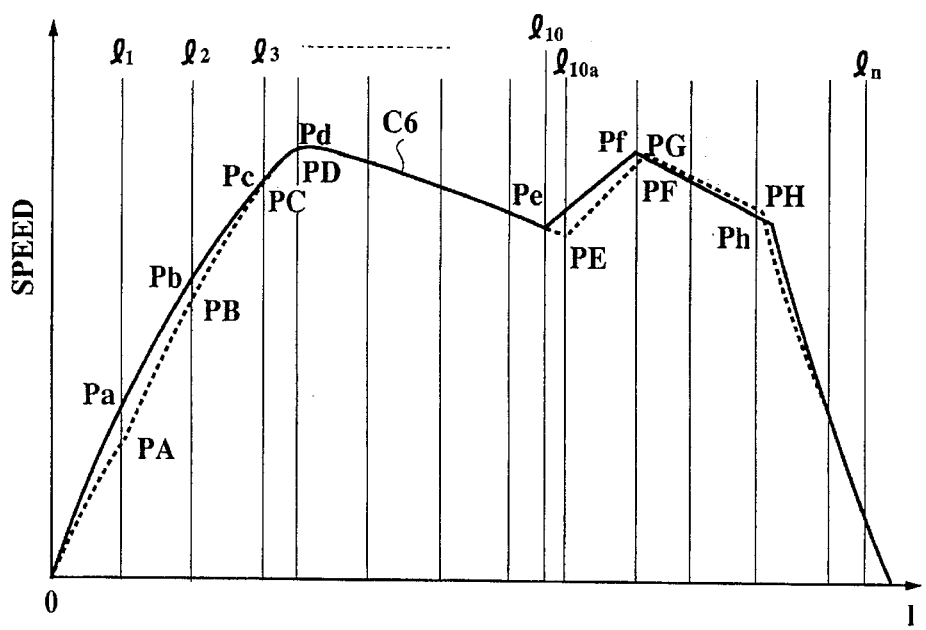

Then, at the step 320, a present running state at each point in the obtained processing result is checked. Namely, as shown in FIG. 20(A), at each of the points $l_1, l_2, \cdots, l_n$, the ATO device 20 stores the train speed, electric power, and acceleration while the microprocessors continue to calculate these quantities. Here, the points $l_1, l_2, \cdots l_n$ can be set up by using the keyboard 23, and the calculation results can be displayed on the display 21. In FIG. 20(A), the section in which the break current becomes negative is a regenerative breaking section.

Next, at the step 330, the evaluation function including an arrival time accuracy factor, a stop position accuracy factor, a comfortability factor, and an energy consumption efficiency factor are checked. Namely, the ATO device 20 stores a predetermined ideal running pattern curve for each evaluation function factor as shown in FIG. 20(B). The curve C1 is a running pattern curve for maximizing the arrival time accuracy factor, for which the other evaluation function factors are controlled to be only within the tolerable ranges; the curve C2 is a running pattern curve for maximizing the energy consumption efficiency factor, for which the other evaluation function factors are controlled to be only within the tolerable ranges; the curve C3 is a running pattern curve for maximizing the comfortability factor, for which the other evaluation function factors are controlled to be only within the tolerable ranges; and the curve C4 is a running pattern curve for maximizing the stop position accuracy factor, for which the other evaluation function factors are controlled to be only within the tolerable ranges. Here, it is impossible to maximize all four evaluation function factors simultaneously, so that it is necessary to establish the priority order among the evaluation function factors. Here, it is assumed that the priority order is an order of curves C1, C2, C3, and C4. This priority order can be set up or changed by the keyboard 23 and displayed on the display 22.

Thus, at the step 330, at each of the points $l_1, l_2, \ldots, l_n$, the present running pattern curve is compared with each of the curves shown in FIG. 20(B), and the comparison results are fed to the neural network as input factors.

This comparison is done as follows. Namely, the differences between the present running pattern curve and the evaluation curve are checked at each point and expressed in terms of coefficients. For example, when the present running pattern curve has a value equal to 1.01 times the value of the evaluation curve for the arrival time accuracy factor at a point $l_1$, the coefficient for this factor at this point is set to be 1.01, when the present running pattern curve has a value equal to 0.98 times the value of the evaluation curve for the arrival time accuracy factor at a point $l_2$, the coefficient for this factor at this point is set to be 0.98, and so on. Such a coefficient as an input factor of the neural network will be multiplied by the predetermined weight which is proportional to the priority order.

Next, at the step 340, the present running pattern curve is compared with the past superior running pattern curve. Namely, the ATO device 20 stores the superior running pattern curve C5 shown in FIG. 20(C) which was obtained in the past and for which the total evaluation of the evaluation function factors has been the highest. The present running pattern curve and this superior running pattern curve C5 are compared at each point, where the comparison results are fed to the neural network as input factors.

Finally, at the step 350, the neural network control is carried out according to the neural network input factors obtained at the steps 330 and 340 as follows.

In the neural network, the input factors from the input layer are connected at the intermediate layer, and the inference results obtained by the intermediate layer are supplied to the output layer. Then, the output layer makes the final judgement and outputs the command outputs for which the error with respect to the ideal outputs can be minimized. Here, the output command is one of the power running notch command, an inertial running command, and a break notch command. In order to obtain the appropriate output commands, it is necessary to keep supplying sufficient amount of inputs as well as the information on the ideal outputs.

The following information is supplied in this embodiment.

(1) ATC pattern speed information
(2) ground signal condition for train stop control
(3) train type condition (train length, train weight, acceleration, driving torque, electric power, etc.)
(4) ATO processing results information (train speed, distance, acceleration, comfortability, electric power, etc.)
(5) evaluation function information (according to the priority order)
(6) the past superior running pattern curve By utilizing these input information, the neural network obtains the most appropriate running pattern curve C6 shown in FIG. 20(D). The present running pattern curve and this most appropriate running pattern curve C6 are compared.

In FIG. 20(D), the difference Pa-PA is generated at the point $l_1$. Then, the output at this point $l_1$ is inferred and determined such that the difference Pb-PB at the next point $l_2$ will become minimum. Similarly, for the difference Pb-PB generated at the point $l_2$, the output at this point $l_2$ is inferred and determined such that the difference Pc-PC at the next point $l_3$ will become minimum, and so on.

When the present running pattern curve is determined to be superior to the past superior running pattern curve is updated by the present running pattern curve, such that the updated superior running pattern curve is always stored in the ATO device 20.

Figure 21:
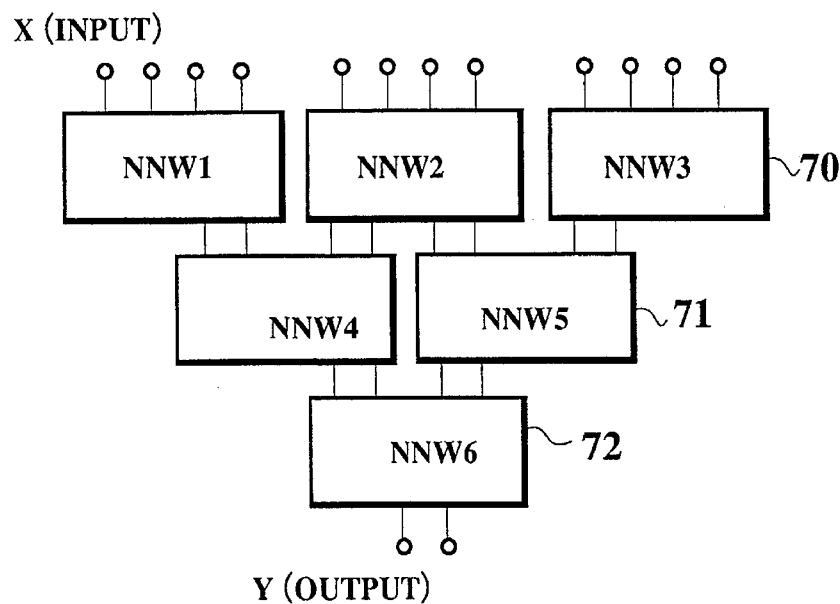
FIG. 21 is a schematic diagram of one possible neural network configuration to be used in carrying out the procedure of FIG. 18.

It is to be noted that the neural network to be used in this embodiment may be constructed from a plurality of neural networks, as shown in FIG. 21. In this configuration of FIG. 21, a hierarchical structure is formed by using six neural networks NNW1 to NNW6 in three layers 70, 71, and 72.

Figure 22:
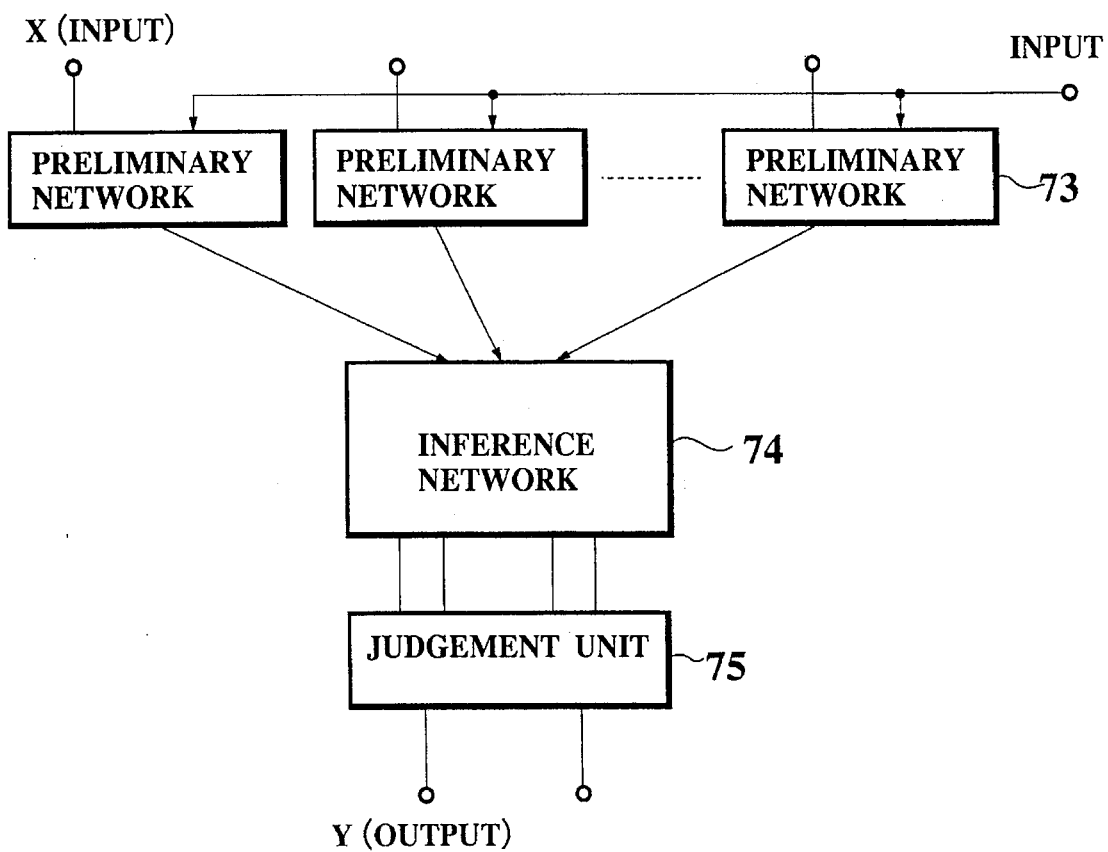
FIG. 22 is a schematic diagram of another possible neural network configuration to be used in carrying out the procedure of FIG. 18.

Also, the neural network may be constructed in a hierarchical structure shown in FIG. 22, where the structure comprises preliminary networks 73 for judging and selecting the input conditions, an inference network 74 for carrying out the inference of a plurality of candidates for the most appropriate control, and a judgement unit 75 for making a final judgement for the most appropriate control from the candidates inferred by the inference network 74.

Besides these, many modifications and variations of the above embodiments may be made without departing from the novel and advantageous features of the present invention. Accordingly, all such modifications and variations are intended to be included within the scope of the appended claims.

What is claimed is:

1. An automatic train operation apparatus incorporating a security function, for controlling a train operation, comprising:

an automatic train operation and control (ATO/C) system including a plurality of ATO/C units provided redundantly, each ATO/C unit having a fail safe configuration with a reliability ATO including a plurality of execution processors and a supervisory processor for monitoring operations of the execution processors and determining an output of said each ATO/C unit, all of the execution processors in the plurality of ATO/C units simultaneously executing an identical automatic train operation program for obtaining a control command output for controlling the train operation; and majority logic means for selecting an output obtained by a majority of the ATO/C units of the ATO/C system as a control command output of the ATO/C system for controlling the train operation such that a total reliability R of the apparatus is greater than the reliability ATO of each ATO/C unit.

2. The automatic train operation apparatus of claim 1, wherein the supervisory processor of each ATO/C unit has a function of disconnecting said each ATO/C unit when a malfunction is detected in one of the execution processors in said each ATO/C unit.

3. The automatic train operation apparatus of claim 2, further comprising a continuation switch means for forcing the majority logic means to select an output obtained by a minority of the execution processors in the ATO/C units of the ATO/C system as the control command output of the ATO/C system at times when a majority of the ATO/C units in the ATO/C system are disconnected.

4. The automatic train operation apparatus of claim 1, wherein each execution processor operates as a neural network with a learning function.

5. An automatic train operation apparatus incorporating a security function, for controlling a train operation, comprising:

input means for entering external information signals;

an automatic train operation and control (ATO/C) system including at least one ATO/C unit having a fail safe configuration including a plurality of execution processors and a supervisory processor for monitoring normal operations of the execution processors and determining an output of said ATO/C unit, wherein the execution processors in the ATO/C unit simultaneously execute an identical automatic train operation program for obtaining a control command output for controlling the train operation by using the external information signals entered by the input means, such that automatic train operation for automatically controlling the train operation and automatic train control for providing a security function are integrally realized in each ATO/C unit; and control means for controlling a power running notch and a brake notch of a train according to the control command output produced from the ATO/C unit.

6. The automatic train operation apparatus of claim 5, wherein the ATO/C system includes:

a plurality of ATO/C units, the ATO/C unit being redundantly provided;

a majority logic means for selecting an output obtained by a majority of the execution processors in the ATO/C units of the ATO/C system as the control command output to be outputted to the control means.

7. The automatic train operation apparatus of claim 6, wherein the supervisory processor of each ATO/C unit has a function of disconnecting said each ATO/C unit when a malfunction is detected in one of the execution processors in said each ATO/C unit.

8. The automatic train operation apparatus of claim 7, further comprising a continuation switch means for forcing the majority logic means to select an output obtained by a minority of the execution processors in the ATO/C units of the ATO/C system as the control command output form the ATO/C system, at times when a majority of the ATO/C units in the ATO/C system are disconnected.

9. The automatic train operation apparatus of claim 5, wherein each execution processor operates as a neural network with a learning function.

10. An automatic train operation method using a neural network with a learning function, comprising the steps of:

controlling a power running notch and a brake notch of a train by estimating a train speed, a running distance, and a stop position using the neural network with a learning function;

evaluating a quality of train operation in terms of factors including arrival time accuracy, a stop position accuracy, a comfortability, and an energy consumption efficiency, by using the neural network with a learning function in response to the controlling step; and gradually adjusting the controlling step by using the learning function of the neural network in order to minimize any difference between the quality of the train operation evaluated by the evaluation step and a desired quality of the train operation.

11. The automatic train operation method of claim 10, further comprising the steps of:

dividing a total running distance of a train into a plurality of sections; and performing the controlling step, the evaluating step, and the adjusting step at each of the plurality of sections.

12. The automatic train operation method of claim 10, wherein the quality at the evaluating step is evaluated by using an evaluation function including predetermined factors for determining the quality of train operation.

13. The automatic train operation method of claim 10, wherein the quality at the evaluating step is evaluated by comparing a running pattern curve resulting from the controlling step with a past superior running pattern curve.

14. The automatic train operation method of claim 13, wherein the past superior running pattern curve is updated every time a single cycle of the automatic train operation is completed.

15. The automatic train operation method of claim 10, wherein the quality at the evaluating step is evaluated by comparing a running pattern curve resulting from the controlling step with an ideal running pattern curve having a maximized factor for determining the quality.

* * * * *